(12) United States Patent
Tenny

(10) Patent No.: US 9,363,782 B2
(45) Date of Patent: Jun. 7, 2016

(54) METHODS AND APPARATUS FOR WIRELESS DEVICE POSITIONING IN MULTICARRIER CONFIGURATIONS

(75) Inventor: Nathan E. Tenny, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 704 days.

(21) Appl. No.: 13/529,164

(22) Filed: Jun. 21, 2012

(65) Prior Publication Data

US 2012/0329476 A1 Dec. 27, 2012

Related U.S. Application Data

(60) Provisional application No. 61/499,897, filed on Jun. 22, 2011.

(51) Int. Cl.
*H04W 64/00* (2009.01)
*H04W 76/02* (2009.01)

(52) U.S. Cl.
CPC ............ *H04W 64/00* (2013.01); *H04W 76/025* (2013.01)

(58) Field of Classification Search
CPC ... H04W 64/00; H04W 24/10; H04W 64/003; H04B 17/27; H04J 11/0069
See application file for complete search history.

(56) References Cited

U.S. PATENT DOCUMENTS

| 6,823,260 | B1 | 11/2004 | Turcotte |
| 6,941,145 | B2 * | 9/2005 | Ogino ................. G01S 19/12 455/456.1 |
| 6,999,762 | B2 | 2/2006 | Uchida |
| 7,149,534 | B2 * | 12/2006 | Bloebaum .......... G01S 5/0072 342/357.42 |
| 7,376,430 | B2 | 5/2008 | Matsuda |
| 7,768,449 | B2 | 8/2010 | Gaal et al. |
| 7,940,740 | B2 * | 5/2011 | Krishnamurthy et al. .... 370/344 |
| 8,358,243 | B2 | 1/2013 | Lin et al. |
| 8,483,706 | B2 | 7/2013 | Edge et al. |
| 8,634,850 | B2 * | 1/2014 | Moeglein ............ G01S 5/0236 455/456.1 |
| 8,838,132 | B2 | 9/2014 | Prakash et al. |
| 2003/0005085 | A1 | 1/2003 | Matsuno |
| 2003/0022674 | A1 | 1/2003 | Shintai et al. |

(Continued)

FOREIGN PATENT DOCUMENTS

EP 2045613 A1 4/2009
EP 2278842 A1 1/2011

(Continued)

OTHER PUBLICATIONS

SAYED Network-Based Wireless Location http://WWW.ee.ucla.edu/-tarighat/pdf/spm_05_Loation.pdf.

(Continued)

*Primary Examiner* — Matthew Sams
(74) *Attorney, Agent, or Firm* — Arent Fox LLP

(57) ABSTRACT

The described aspects include methods and apparatus for performing positioning for a user equipment (UE). The UE can communicate with a plurality of serving cells in a multi-carrier configuration, and can indicate a plurality of serving cell identifiers corresponding to the plurality of serving cells in a message to a positioning server. The positioning server can obtain location information corresponding to at least a portion of a plurality of cells, or related eNBs, related to the plurality of serving cell identifiers, and can communicate the location information to the UE. The UE can perform positioning based at least in part on the location information.

60 Claims, 14 Drawing Sheets

(56) References Cited

U.S. PATENT DOCUMENTS

| | | |
|---|---|---|
| 2003/0036378 A1 | 2/2003 | Dent |
| 2003/0096624 A1 | 5/2003 | Ormson |
| 2003/0220765 A1 | 11/2003 | Overy et al. |
| 2005/0148340 A1 | 7/2005 | Guyot |
| 2005/0162307 A1 | 7/2005 | Kato |
| 2006/0018276 A1* | 1/2006 | Kim .................. H04L 5/006 370/329 |
| 2006/0063534 A1 | 3/2006 | Kokkonen et al. |
| 2007/0014282 A1 | 1/2007 | Mitchell |
| 2007/0082682 A1 | 4/2007 | Kim et al. |
| 2007/0135089 A1 | 6/2007 | Edge et al. |
| 2007/0149213 A1 | 6/2007 | Lamba et al. |
| 2007/0178913 A1 | 8/2007 | Niemenmaa et al. |
| 2007/0207772 A1 | 9/2007 | Huber et al. |
| 2007/0263576 A1* | 11/2007 | Deguchi .............. H04L 27/2608 370/338 |
| 2008/0008157 A1 | 1/2008 | Edge et al. |
| 2008/0032706 A1 | 2/2008 | Sheynblat et al. |
| 2008/0227463 A1 | 9/2008 | Hizume et al. |
| 2008/0227465 A1* | 9/2008 | Wachter et al. ............ 455/456.1 |
| 2008/0228654 A1 | 9/2008 | Edge |
| 2009/0088180 A1* | 4/2009 | LaMance et al. .......... 455/456.1 |
| 2009/0160711 A1 | 6/2009 | Mehta |
| 2009/0181698 A1 | 7/2009 | Farmer et al. |
| 2009/0253440 A1 | 10/2009 | Edge |
| 2009/0280775 A1* | 11/2009 | Moeglein .............. G01S 5/0236 455/410 |
| 2010/0004003 A1 | 1/2010 | Duggal et al. |
| 2010/0013701 A1 | 1/2010 | Fischer et al. |
| 2010/0227626 A1* | 9/2010 | Dressler et al. ........... 455/456.1 |
| 2010/0331013 A1* | 12/2010 | Zhang ..................... 455/456.2 |
| 2011/0009130 A1* | 1/2011 | Wu .......................... 455/456.1 |
| 2011/0039574 A1* | 2/2011 | Charbit et al. ............. 455/456.1 |
| 2011/0039575 A1 | 2/2011 | Castillo et al. |
| 2011/0098057 A1 | 4/2011 | Edge et al. |
| 2011/0117925 A1* | 5/2011 | Sampath et al. ........... 455/456.1 |
| 2011/0212733 A1 | 9/2011 | Edge et al. |
| 2012/0015666 A1* | 1/2012 | Horn et al. ................ 455/456.1 |
| 2012/0027110 A1 | 2/2012 | Han et al. |
| 2012/0040687 A1* | 2/2012 | Siomina et al. ........... 455/456.1 |
| 2012/0040696 A1 | 2/2012 | Siomina et al. |
| 2012/0083288 A1* | 4/2012 | Siomina ..................... 455/456.1 |
| 2012/0147772 A1* | 6/2012 | Kazmi et al. ................. 370/252 |
| 2012/0329476 A1* | 12/2012 | Tenny ........................ 455/456.1 |
| 2014/0161046 A1 | 6/2014 | Edge et al. |
| 2014/0206390 A1 | 7/2014 | Edge |

FOREIGN PATENT DOCUMENTS

| | | |
|---|---|---|
| GB | 2382270 A | 5/2003 |
| JP | 2003204573 A | 7/2003 |
| JP | 2004-104349 A | 4/2004 |
| JP | 2004516479 A | 6/2004 |
| JP | 2004-279409 A | 10/2004 |
| JP | 2005-207888 A | 8/2005 |
| JP | 2006-521552 A | 9/2006 |
| JP | 2009515201 | 4/2009 |
| JP | 2009545752 | 12/2009 |
| JP | 2010521891 A | 6/2010 |
| JP | 2011523244 A | 8/2011 |
| JP | 2011528785 A | 11/2011 |
| JP | 2011528788 A | 11/2011 |
| JP | 2012/531583 A | 12/2012 |
| JP | 2014/503163 A | 2/2014 |
| KR | 20070039850 A | 4/2007 |
| KR | 2009-0033819 A | 4/2009 |
| KR | 2011-0005226 A | 1/2011 |
| RU | 2107925 C1 | 3/1998 |
| RU | 2263412 C2 | 3/2004 |
| RU | 2316152 C2 | 1/2008 |
| WO | WO9427160 A1 | 11/1994 |
| WO | WO0152569 A1 | 7/2001 |
| WO | WO0172060 A1 | 9/2001 |
| WO | 03007633 A1 | 1/2003 |
| WO | 03034765 A1 | 4/2003 |
| WO | WO-2004/086080 A1 | 10/2004 |
| WO | WO-2005/004527 A1 | 1/2005 |
| WO | WO2007056738 | 5/2007 |
| WO | WO-2007/082038 A1 | 7/2007 |
| WO | WO2008085439 A1 | 7/2008 |
| WO | WO2008089288 A2 | 7/2008 |
| WO | WO2008112819 | 9/2008 |
| WO | WO-2009/129344 A1 | 10/2009 |
| WO | WO-2010/151217 A2 | 12/2010 |
| WO | WO-2011/019917 A1 | 2/2011 |
| WO | WO-2012/099514 A1 | 7/2012 |

OTHER PUBLICATIONS

WIROLA Requirements for the next generation standardized location technology protocol for location-based services. http://www.gnss.com.au/JoGPS/v7n21JoGPS_v7n2p91-103.pdf.

3GPP TS 25.331 V8.1.0 (Dec. 2007); Release 8, 3rd Generation Partnership Project:Sections 8.4, 8,5.7, 10.2.4, 10.2.17, 10.2.18, 10.2.19, 10.3.3,45, 10,3.3.45a, 10.3.7,10.3.8, 14.7 of pages 1through 1471.

3GPP TS 44.031 V7.8.0 Mar. 2008; 3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP), (Release 7), Mar. 2008.

3GPP2 C.S0022, Version 3.0, 3rd Generation Partnership Project 2 "3GPP2", Position Determination Service Standard for Dual Mode Spread Spectrum Systems, Feb. 16, 2001, www.3gpp2.org.

3GPP2 C.S0022-A, Version 1.0, (TIA:IS-801-A), Position Determination Service for cdma2000 Spread Spectrum Systems, Mar. 2004.

"Secure User Plane Location Architecture; Draft Version 2.0, Mar. 18, 2008, OMA-AD-SUPL-V2_0-20080318-D; Open Mobile Alliance," Internet Citation, Mar. 18, 2008, pp. 1-57, XP007912186.

Motorola: "Positioning Support for LTE Rel-9—RAN1 Specific Issues," 3GPP Draft; R1-090321-Positioning Support for LTE REL-9, 3rd Generation Partnership Project (3GPP), Mobile Competence Centre, Jan. 11-16, 2008, retrieved on Jan. 8, 2009, XP050318233.

Nord J et al: "An Architecture for Location Aware Applications," System Sciences, 2002, HICSS. Proceedings of the 35th Annual Hawaii International Conference on Jan. 7-10, 2002; IEEE, vol. 9, Jan. 7, 2002, IEEE, pp. 293-298, XP010587713, ISBN: 978-0-7695-1435-2, http://pure.ltu.se/portal/filed/113899/artikel.pdf.

Orville, "Development of the National Lighting Detection Network," BAMS, Feb. 2008, 11 pages.

"Userplane Location Protocol; Draft Version 2.0, Mar. 14, 2008; OMA-TS-ULP-V2_0-20080314-D, Open Mobile Alliance," Internet Citation, Mar. 14, 2008, pp. 1-24, XP007912187.

International Search Report and Written Opinion—PCT/US2012/043758—ISA/EPO—Aug. 28, 2012.

3GPP: "Overview of 3GPP Release 9 V0.0.5 (Apr. 2009)", pp. 1-174, Apr. 14, 2009.

Qualcomm Europe: "LCS Control Plane Alternatives for EPS", 3GPP Draft; S2-085599 (LCS Control Plane Solution for EPS), 3rd Generation Partnership Project (3GPP), Mobile Competence Centre ; 650, Route Des Lucioles ; F-06921 Sophia-Antipolis Cedex ; France, vol. SA WG2, no. Sophia Antipolis, France; 20080825-20080829, Aug. 29, 2008, XP050628859, [retrieved on Aug. 29, 2008] chapter 1.1 chapters 10.2, 10.3 figures 22, 23.

* cited by examiner

METHODS AND APPARATUS FOR WIRELESS DEVICE POSITIONING IN MULTICARRIER CONFIGURATIONS

CLAIM OF PRIORITY UNDER 35 U.S.C. §119

The present Application for Patent claims priority to Provisional Application No. 61/499,897, entitled METHOD AND APPARATUS FOR WIRELESS DEVICE POSITIONING IN MULTICARRIER CONFIGURATIONS, filed Jun. 22, 2011, assigned to the assignee hereof and hereby expressly incorporated by reference herein.

BACKGROUND

1. Field

The following description relates generally to wireless network communications, and more particularly to performing positioning for one or more devices.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile user equipment (UE). Each UE may communicate with one or more evolved Node B (eNB) via transmissions on forward and reverse links. The forward link (or downlink) refers to the communication link from eNB to UE, and the reverse link (or uplink) refers to the communication link from UE to eNB. Further, communications between UE and eNB may be established via single-input single-output (SISO) systems, multiple-input single-output (MISO) systems, multiple-input multiple-output (MIMO) systems, and so forth.

In addition, UEs can perform positioning in the wireless communication network by measuring signals received from one or more eNBs and comparing the signals according to locations of the one or more eNBs (e.g., using Observed Time Difference of Arrival (OTDOA), Assisted Global Navigation Satellite System (A-GNSS), or other techniques based on signals received from the eNBs and related location information, enhanced cell identifier (E-CID), and/or the like). In one example, a UE can communicate an identifier of a serving eNB, or its related cell, to a positioning server in the core wireless network. The positioning server can specify location information regarding the eNB and/or other neighboring eNBs (e.g., along with associated identifiers) to the UE based on the identification of the serving eNB. The UE can accordingly perform positioning based on the location information and signals measured of at least a portion of the indicated neighboring eNBs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with indicating multiple cells or related evolved Node Bs (eNBs) serving a user equipment (UE) in a multicarrier configuration for performing positioning at the UE. A component that receives the indication of the multiple cells can provide location information regarding the multiple cells to the UE for determining a position. In addition, location information regarding neighboring cells or related eNBs to the multiple cells or eNBs can be provided to the UE. For example, the neighboring cells for which to provide location information can be selected based on the multiple cells indicated by the UE. This can include providing location information for neighboring cells that can likely be heard by the UE based on the indicated multiple cells, providing location information for neighboring cells that operate on a same frequency as at least a portion of the indicated multiple cells to avoid UE having to switch frequencies to perform measurements thereof for determining positioning, etc.

In one example, a method for performing positioning for a UE is provided. The method includes communicating with a plurality of serving cells in a multicarrier configuration and indicating a plurality of serving cell identifiers corresponding to the plurality of serving cells in a message to a positioning server.

In another aspect, an apparatus for performing positioning for a UE is provided. The apparatus includes means for communicating with a plurality of serving cells in a multicarrier configuration and means for indicating a plurality of serving cell identifiers corresponding to the plurality of serving cells in a message to a positioning server.

Still, in another aspect, a computer-program product for performing positioning for a UE is provided including a non-transitory computer-readable medium having code for causing at least one computer to communicate with a plurality of serving eNBs in a multicarrier configuration and code for causing the at least one computer to indicate a plurality of serving cell identifiers corresponding to the plurality of serving cells in a message to a positioning server.

In yet another aspect, an apparatus for performing positioning for a UE is provided including a processor and a memory in electronic communication with the processor. The apparatus further includes instructions stored in the memory executable by the processor to communicate with a plurality of serving cells in a multicarrier configuration and indicate a plurality of serving cell identifiers corresponding to the plurality of serving cells in a message to a positioning server.

Moreover, in an aspect, an apparatus for performing positioning for a UE is provided. The apparatus includes a multicarrier communicating component for communicating with a plurality of serving cells in a multicarrier configuration and a serving cell identifier providing component for indicating a plurality of serving cell identifiers corresponding to the plurality of serving cells in a message to a positioning server.

In another example, a method for providing location information to a UE is provided including receiving a message comprising a plurality of serving cell identifiers related to a UE and obtaining location information corresponding to at least a portion of a plurality of cells related to the plurality of serving cell identifiers. The method further includes communicating the location information to the UE In another aspect, an apparatus for providing location information to a UE is provided. The apparatus includes means for receiving a message comprising a plurality of serving cell identifiers related to a UE, means for obtaining location information corresponding to at least a portion of a plurality of cells related to the plurality of serving cell identifiers, and means for communicating the location information to the UE.

Still, in another aspect, a computer-program product for providing location information to a UE is provided including a non-transitory computer-readable medium having code for causing at least one computer to receive a message comprising a plurality of serving cell identifiers related to a UE, code for causing the at least one computer to obtain location information corresponding to at least a portion of a plurality of cells related to the plurality of serving cell identifiers, and code for causing the at least one computer to communicate the location information to the UE.

In yet another aspect, an apparatus for providing location information to a UE is provided including a processor and a memory in electronic communication with the processor. The apparatus further includes instructions stored in the memory executable by the processor to receive a message comprising a plurality of serving cell identifiers related to a UE, obtain location information corresponding to at least a portion of a plurality of cells related to the plurality of serving cell identifiers, and communicate the location information to the UE.

Moreover, in an aspect, an apparatus for providing location information to a UE is provided. The apparatus includes a serving cell identifier receiving component for receiving a message comprising a plurality of serving cell identifiers related to a UE, a location information determining component for obtaining location information corresponding to at least a portion of a plurality of cells related to the plurality of serving cell identifiers, and a location information communicating component for communicating the location information to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
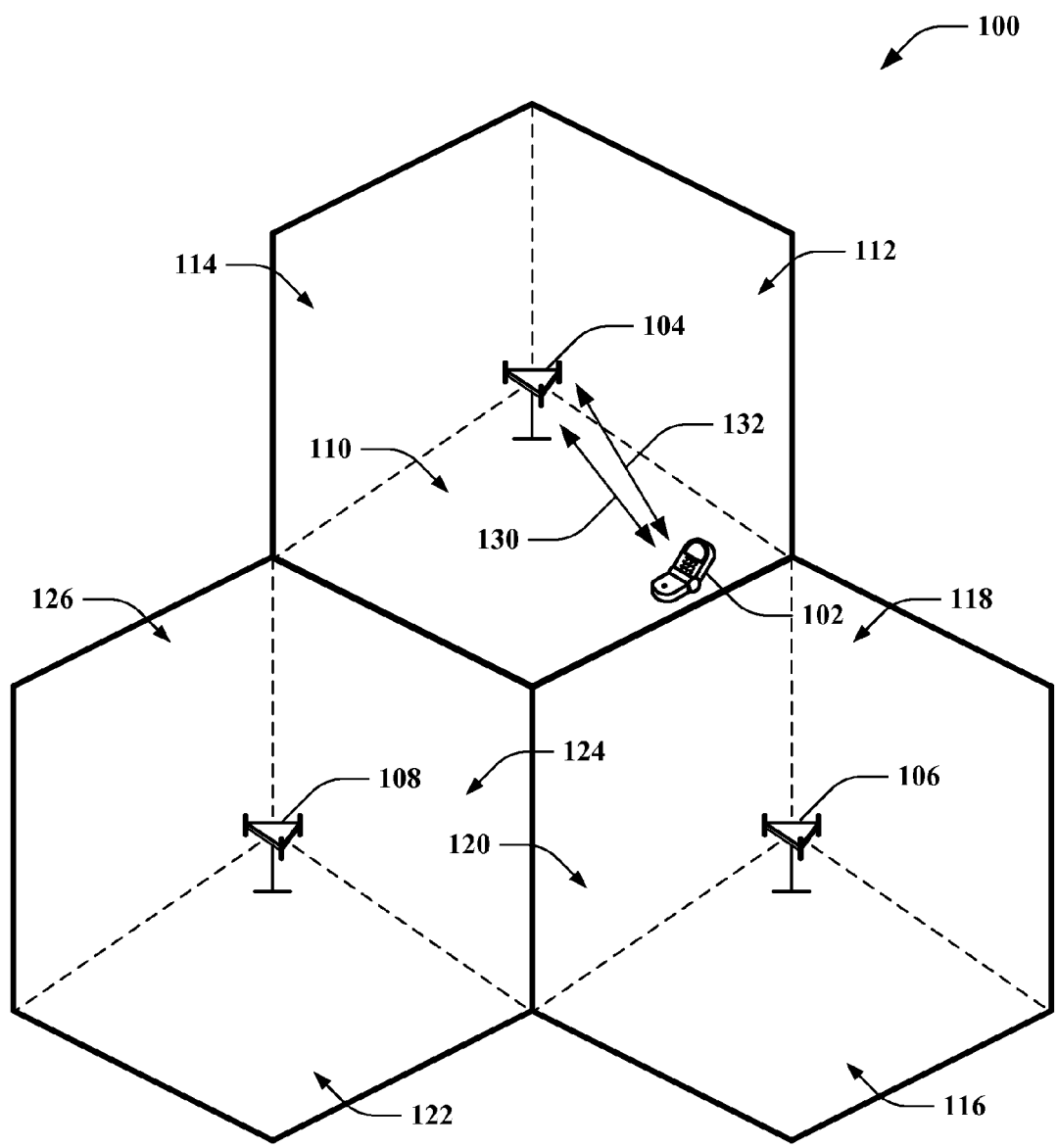
FIG. 1 illustrates an example system for performing positioning based on multiple serving cells.
Figure 1:
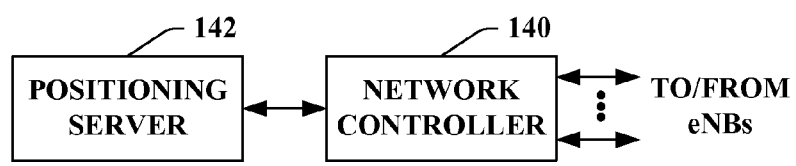

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to indicating identifiers of multiple evolved Node Bs (eNB) or related cells serving a user equipment (UE) in a multicarrier configuration to a component that provides related location information. The component can provide location information regarding the multiple eNBs, or related cells, to the UE and/or location information of other neighboring eNBs, or related cells, to the UE to facilitate using additional reference points in determining positioning. For instance, the neighboring eNBs or related cells can be selected based on the multiple indicated cells, based on utilizing a common frequency of at least a portion of the multiple indicated cells, etc. In this regard, the UE can obtain the location information and measure signals from corresponding eNBs or cells. The UE can then perform positioning based on the signals and location information (e.g., using Observed Time Difference of Arrival (OTDOA), Assisted Global Navigation Satellite System (A-GNSS), or other techniques, enhanced cell identifier (E-CID), and/or the like). In this regard, identification of the multiple identified serving eNBs or related cells is used to provide more precise location information of nearby eNBs or cells and/or location information for eNBs or cells that do not require switching frequency to conserve power at the UE.

As used in this application, the terms "component," "module," "system" and the like are intended to include a computer-related entity, such as but not limited to hardware, firmware, a combination of hardware and software, software, or software/firmware in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example wireless communication system 100 for indicating a plurality of serving cell identifiers to a positioning server to facilitate determining a position of a related UE. System 100 includes a UE 102 that is served by one or more cells of one or more eNBs 104, 106, and 108 in a multicarrier configuration. For example, the multicarrier configuration can relate to aggregating carriers of a plurality of eNBs, as described herein, for simultaneously receiving the same or different data therefrom. In the depicted example, eNB 104 provides multiple cells 110, 112, and 114, eNB 106 provides multiple cells 116, 118, and 120, and eNB 108 provides multiple cells 122, 124, and 126. Though shown substantially as macro node coverage, it is to be appreciated that system 100 can include one or more femto nodes, relays, etc., as well that can serve one or more UEs. In addition, system 100 includes a network controller 140 that can facilitate communication between the eNBs 104, 106, and 108, and one or more other components, such as components of a core wireless network. A positioning server 142 is also shown that provides location information regarding a plurality of eNBs to the UE 102 (e.g., via network controller 140 to one or more eNBs 104, 106, or 108 serving UE 102). Positioning server 142 can be a component in a core network related to eNBs 104, 106, and 108 and can communicate with the eNBs 104, 106, and 108 (and/or other eNBs) to receive location information therefrom and/or provide location information to served UEs.

In an example, UE 102 can be served by cells 110 and 112 over respective carriers 130 and 132 in a multicarrier configuration. In this example, UE 102 can provide an indication of its multiple serving cells 110 and 112 to positioning server 142. This can include providing identifiers thereof in a message to the positioning server 142 (e.g., via a primary component carrier (PCC), which can be carrier 130 or 132, etc.). Positioning server 142 can obtain the identifiers and provision location information for the cells 110 and 112, and/or neighboring cells, such as cells 114, 118, 120, 124, etc., or corresponding eNBs to UE 102 based on the identifiers. Receiving identifiers of the multiple cells serving UE 102 allows the positioning server 142 to determine a set of cells for which to provision location information to the UE 102. This can improve the quality of location information provided to the UE 102 as opposed to where UE 102 sends an identifier of a single cell to the positioning server 142.

In one example, as UE 102 is served not only in cell 110, but also by cell 112, positioning server 142 can determine to provide location information for additional cells 114, 118, 120 and/or 124. For instance, positioning server 142 can determine not to provide location information for cells 116, 122, or 126 because the UE 102 is served by cells 110 and 112, from which positioning server 142 can infer that UE 102 is closer to cells 114, 118, 120 and/or 124, than if UE 102 was served by other cells. For example, if UE 102 was instead served by cells 110 and 114, positioning server 142 may infer that UE 102 is closer to cell 126, and not 118, and may accordingly include location information for cell 126 and not 118. Thus, positioning server 142 determines a set of eNBs or cells for which to provide location information based on a current serving set of cells 110 and 112, as indicated by UE 102. Upon receiving the location information, UE 102 can limit signal measuring to cells 110, 112, 114, 118, 120, and/or 124, and can determine a position of UE 102 based on the measurements and location information (e.g., using OTDOA, A-GNSS, E-CID, etc., as described above).

In another example, positioning server 142 can determine to provide location information for additional cell 118 based additionally or alternatively on an operating frequency thereof. For example, positioning server 142 can determine that eNB 106 uses a similar operating frequency to provide cell 118 as eNB 104 uses to provide cell 110 and/or 112, and thus UE 102 need not switch frequencies to measure cell 118. Positioning server 142 may determine, however, that eNB 106 operates cell 120 using a frequency different from cells 110 and 112, and thus may not provide location information of cell 120 to UE 102. Thus, UE 102 can measure the additional cells on the same frequency as one or more of the current serving cell for determining positioning, as described. Moreover, though shown and described with two cells, it is to be appreciated that UE 102 or other UEs described herein, can operate in the multicarrier configuration with substantially any number of cells, and can thus report serving cell identifiers therefor. In addition, though shown as served by cells of a single eNB 104, it is to be appreciated that UE 102 can be served by cells of multiple eNBs, and can similarly report cell identifiers thereof for determining positioning.

Figure 2:
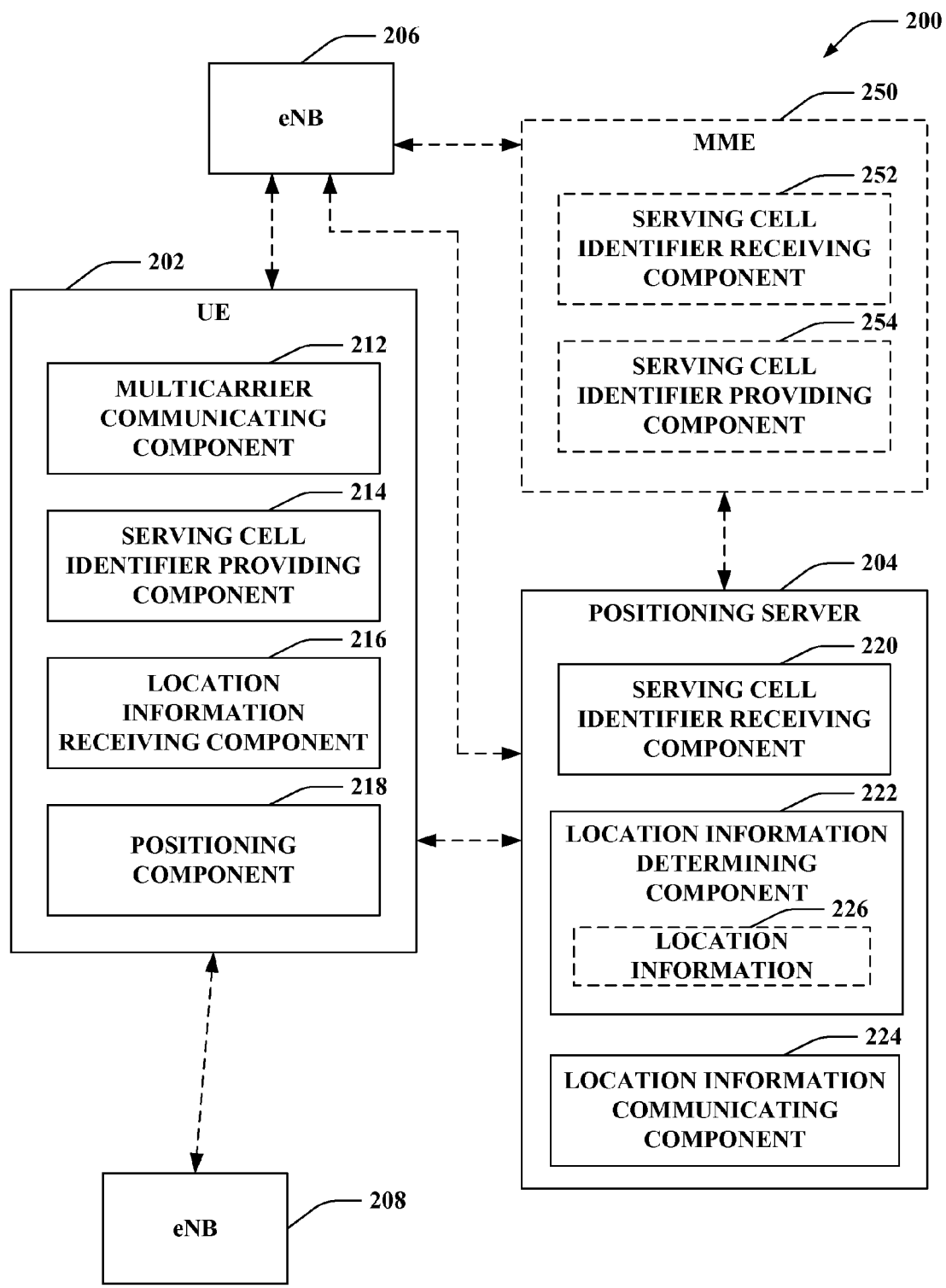
FIG. 2 illustrates an example system for indicating a plurality of serving cell identifiers to a positioning server for receiving related location information.

FIG. 2 illustrates an example wireless communication system 200 that facilitates performing positioning for a UE. System 200 includes a UE 202 that communicates with a positioning server 204 for obtaining location information for performing positioning in a wireless network. In addition, system 200 includes one or more eNBs 206 or 208 by which UE 202 can be served in one or more cells using a multicarrier configuration in the wireless network. As depicted, for example, UE 202 can communicate with positioning server 204 via at least one of the eNBs 206 (e.g., traversing one or more other network components). UE 202 may also communicate with positioning server 204 directly. UE 202 can be a mobile terminal, a stationary terminal, a tethered device (such as a modem), a portion thereof, and/or the like. Positioning server 204 can be a serving mobile location center (SMLC), evolved SMLC (E-SMLC), SUPL (Secure User Plane Location) Location Platform (SLP), another entity that stores/provides position/location related information in a wireless network, and/or the like. Moreover, eNBs 206 and/or 208 can each be an access point, a macro node, femto node, pico node, micro node, or similar eNB, a relay node, a mobile base station, a UE (e.g., communicating in peer-to-peer or ad-hoc mode with UE 202), a portion thereof, and/or the like.

UE 202 can include a multicarrier communicating component 212 for communicating with a plurality of cells of one or more eNBs over a plurality of carriers, and a serving cell identifier providing component 214 for communicating identifiers of the plurality of cells, or related eNBs, to a positioning server. UE 202 also includes a location information receiving component 216 for obtaining location information from the positioning server based on the identifiers, and a positioning component 218 for computing a position of the UE 202 based at least in part on the location information.

Positioning server 204 includes a serving cell identifier receiving component 220 for obtaining a plurality of cell identifiers from a UE, a location information determining component 222 for obtaining location information 226 for the UE based on the cell identifiers, and a location information communicating component 224 for providing the location information 226 to the UE 202.

In addition, system 200 optionally includes a mobility management entity (MME) 250 or other supporting network node that can communicate with positioning server 204 to provide serving cell information of UE 202 thereto. MME 250 includes a serving cell identifier receiving component 252 that obtains one or more serving cell identifiers from UE 202, and a serving cell identifier providing component 254 that can indicate one or more serving cell identifiers to positioning server 204.

According to an example, multicarrier communicating component 212 can communicate with a plurality of cells serving UE 202 to receive multicarrier access in a wireless network. For example, the plurality of cells can be provided by one or more eNBs 206 and/or 208, and can support simultaneous communication of user plane data and/or control data with UE 202 over one or more carriers in the given cells. In this regard, the multicarrier communicating component 212 receives signals from eNB 206 and/or 208 in the plurality of cells, and/or transmits signals thereto over the multiple carriers. Periodically (e.g., based on a timer or other trigger or event, such as an application layer request), positioning component 218 can initiate position determination at UE 202. In this example, serving cell identifier providing component 214 can determine identifiers of the plurality of cells, or related eNBs 206 or 208, and can communicate the identifiers to positioning server 204.

In one example, UE 202 can communicate the identifiers to positioning server 204 at least via eNB 206. For example, UE 202 can have established a primary component carrier (PCC) with eNB 206 in a cell over which control data can be communicated with the wireless network. In this example, eNB 206 can communicate with positioning server 204 via one or more components of the wireless network, such as MME 250 or other supporting nodes. In another example, MME 250 can otherwise obtain serving cell identifiers from UE 202 (e.g., via serving cell identifier receiving component 252), and serving cell identifier providing component 254 can provide the serving cell identifiers to positioning server 204. Moreover, for example, the serving cell identifiers can correspond to a global cell identifier (such as a E-UTRAN cell global identifier (ECGI), etc.), an operating frequency, a carrier identifier, etc., of the cells or related eNBs 206 or 208. The serving cell identifiers can serve to identify (e.g., uniquely) the cells. In one example, the carrier identifier can correspond to a frequency of the carrier.

Serving cell identifier receiving component 220 can obtain the multiple serving cell identifiers, and location information determining component 222 can obtain location information 226 related to the cells (e.g., a location of the corresponding eNB) and/or of other cells or related eNBs based on the serving cell identifiers. For example, various eNBs, such as eNBs 206 and 208, can provide location information and/or related cell information (e.g., cell identifiers) to positioning server 204 at some previous point in time (e.g., upon request from the positioning server 204, initialization of the eNBs in the wireless network, etc.). In another example, the positioning server 204 can otherwise be provisioned with such information from one or more core network components, a configuration, operator input, and/or the like. In any case, location information determining component 222 can store location information for various eNBs or related cells as an association between a geographic location or related information of an eNB and one or more cell identifiers. The geographical location, for example, can include an absolute location (e.g., using global positioning system (GPS) or similar coordinates), a relative location (e.g., a direction and distance of a known reference point), etc., of the eNB or locations within the cells themselves.

In an example, location information determining component 222 can determine one or more other cells near the identified serving cells. This can include determining cells of other nearby eNBs based on a distance or radio visibility from at least a portion of the serving eNBs 206 and/or 208 to other eNBs. In one example, location information determining component 222 infers at initial position of UE 202 based on analyzing all of the serving cells and related locations. In an example, where one serving cell is near some other cell (e.g., the cells or related eNBs are within a threshold distance or have radio visibility to one another), location information determining component 222 can determine to not include location information of the other cell where none of the other serving cells are near the other cell or related eNB (based on location information 226), as this can indicate the UE 202 is likely not close enough to the other cell, and thus would likely not benefit from receiving its location information. In another example, location information determining component 222 can generate or otherwise receive neighbor lists for each serving cell or related eNB, and can determine whether to include location information of one or more nearby cells or related eNBs based on whether the nearby cells or related eNBs are in one or a certain number of the neighbor lists for the serving cells or related eNB 206 or 208.

In an additional or alternative example, location information determining component 222 can obtain location information 226 for other cells near the serving cells (or cells or eNBs near eNBs 206 or 208 that provide the serving cells) where the nearby cells utilize a similar operating frequency to at least one of the serving cells (referred to herein as intra-frequency location information). Positioning component 218 can measure signals from such cells without having to switch to other frequencies to perform such measurements. Thus, in this example, location information determining component 222 may refrain from providing location information related to cells that utilize a different operating frequency regardless of whether the cells are nearby serving cells (or related eNBs are nearby eNB 206 or 208 that provide the serving cells).

In one example, the serving cell identifiers received from UE 202, as described, can be global cell identifiers, operating frequencies, carrier frequencies, etc., of the serving cells. Thus, location information determining component 222 can determine the location information 226 as received regarding one or more serving cells based on obtaining the location information associated with the given cell identifiers, operating frequencies, and/or carrier identifiers. As described, location information determining component 222 can determine additional cells nearby those identified, which can be based on a distance between the cells or related eNBs, additional cells that utilize the same indicated operating frequency, additional cells that utilize the same carrier identifier, additional cells that have radio visibility at the one or more serving cells (e.g., the one or more serving cells or UEs communicating therewith can hear signals from the additional cells), and/or the like.

In one example, serving cell identifier providing component 214 can indicate a global cell identifier of one serving cell (e.g., the serving cell associated with the PCC) while including operating frequencies or carrier identifiers of other cells (e.g., cells associated with secondary component carriers (SCC)). In this example, location information determining component 222 can determine the serving cell location information 226 based on the global cell identifier of the serving cell, and can determine other cell location information 226 for cells nearby based on the operating frequencies or carrier identifiers (e.g., by selecting cells and/or related eNBs near the serving cell for which the global cell identifier is provided that utilize the same operating frequencies or carrier identifiers of the other serving cells).

In any case, location information communicating component 224 can provide the location information 226 for the serving cells, and/or additional location information 226 for other cells, as described above, to UE 202. In this example, location information receiving component 216 can obtain the location information 226, and positioning component 218 can perform positioning for UE 202 based at least in part on the location information 226. In one example, positioning component 218 can additionally measure signals from the serving cells, as well as any other cells identified in the received location information 226. It is to be appreciated that the location information 226 can include other cells of eNBs 206 or 208 that provide the serving cells. In one example, where positioning server 204 does not discriminate cells for which it provides location information 226 based on operating frequency, positioning component 218 can limit measuring to cells or related eNBs that utilize a similar operating frequency. In either case, positioning component 218 can accordingly determine a position of UE 202 using the signals and location information 226 (e.g., using OTDOA, A-GNSS, E-CID, etc.). Thus, multiple serving cells of UE 202, and/or other cells selected based on the serving set of cells, can be utilized as additional points of reference in determining a position.

In a specific example, serving cell identifier providing component 214 can indicate a cell identifier to MME 250 (e.g., this can be part of initializing communications with MME 250, adding a carrier with a new eNB or related cell, etc.), and serving cell identifier receiving component 252 can obtain the cell identifier. In one example, it is to be appreciated that serving cell identifier receiving component 252 can receive the cell identifier from the eNB that facilitates communicating between UE 202 and MME 250. In any case, serving cell identifier receiving component 252 can obtain serving cell identifiers related to UE 202, and serving cell identifier providing component 254 can communicate the cell identifiers to positioning server 204 in a Location Services (LCS) Application Protocol (LCS-AP) Request Location message to the positioning server 204 using a LTE Positioning Protocol (LPP) message. Positioning server 204, which can be an E-SMLC in this example, can obtain serving cell information for UE 202 from MME 250. In this example, serving cell identifier providing component can provide an identifier of the serving cell or related eNB that provides the PCC for UE 202 in the multicarrier configuration (e.g., a cell of eNB 206).

In this example, serving cell identifier providing component 254 can also include a list of additional (e.g., or secondary) serving cell identifiers (e.g., related to eNBs 208 and 210), and/or a list of corresponding operating frequencies thereof, as an extension of the LCS-AP Request Location message to positioning server 204. Thus, serving cell identifier receiving component 220 can obtain the LCS-AP Request Location message, and can determine the existence of the additional serving cell identifiers. Location information determining component 222, in this example, can obtain location information 226 for the additional serving cell identifiers and/or for one or more nearby cells or related eNBs (e.g., cells or eNBs indicated in a neighboring list, cells or related eNBs within a threshold distance of the eNB providing the serving cell with which the PCC is established based on the location information, cells or related eNBs that utilize a similar operating frequency as the serving cells, and/or the like, as described). Location information communicating component 224 can transmit the location information 226 to UE 202 for determining its position.

In another specific example, serving cell identifier providing component 214 can indicate the multiple serving cells identifiers to positioning server 204 via a Provide Location Information message in LPP. For example, this message can be extended to allow reporting of multiple instances of location information corresponding to the plurality of serving cell identifiers or operating frequencies, as described above with respect to the LCS-AP protocol.

Similarly, in other technologies, such as Secure User Plane Location (SUPL), serving cell identifier providing component 214 can specify a list of serving cell identifiers related to the serving cells of UE 202 provided by eNB 206 or 208 in a SUPL START, SUPL POS INT, or similar message to positioning server 204. In this example, UE 202 can be substantially any SUPL enabled terminal, and positioning server 204 can be a SUPL location platform. For example, serving cell identifier providing component 214 can utilize the Location ID field in the SUPL message, which can be extended to allow reporting multiple serving cell identifiers. Serving cell identifier receiving component 220 can obtain the message with the list of serving cell identifiers. In another example, serving cell identifier providing component 214 can specify the serving cell identifiers in the Multiple Location IDs field in SUPL and can set the associated Serving Cell Flag, as defined in SUPL, to TRUE for the serving cell identifiers in the Multiple Location IDs. Serving cell identifier receiving component 220 can obtain the Multiple Location IDs field, and determine the serving cell identifiers based at least in part on whether the Serving Cell Flag is set to TRUE for a given serving cell identifier. In either example, location information determining component 222 can determine location information 226 for the list of determined serving cell identifiers, and/or other nearby serving cells or cells that utilize the same operating frequency, as described. Location information communicating component 224 can provide the location information 226 to UE 202.

In yet another example, serving cell identifier providing component 214 can use an identical timestamp value to indicate serving cells in the Multiple Location IDs field, and can provide the Multiple Location IDs field to positioning server 204 in a SUPL message. In this example, no new field is added to the SUPL message structure. For example, this can include indicating a 0 or omit value for the Relative Timestamp in the corresponding Multiple Location IDs field. Serving cell identifier receiving component 220 can obtain the Multiple Location IDs, and location information determining component 222 can determine whether an identifier is a serving cell identifier based at least in part on the timestamp value. In this regard, location information determining component 222 can provide location information 226 for the list of serving cell identifiers, and/or other nearby serving cells as described.

In addition, though the foregoing aspects are shown and described with respect to a UE 202, it is to be appreciated that a femto node, location measurement unit (LMU), and/or any suitable wireless network device can be equipped with the foregoing components to provide multiple serving cell identifiers for performing positioning, as described.

Figure 3:
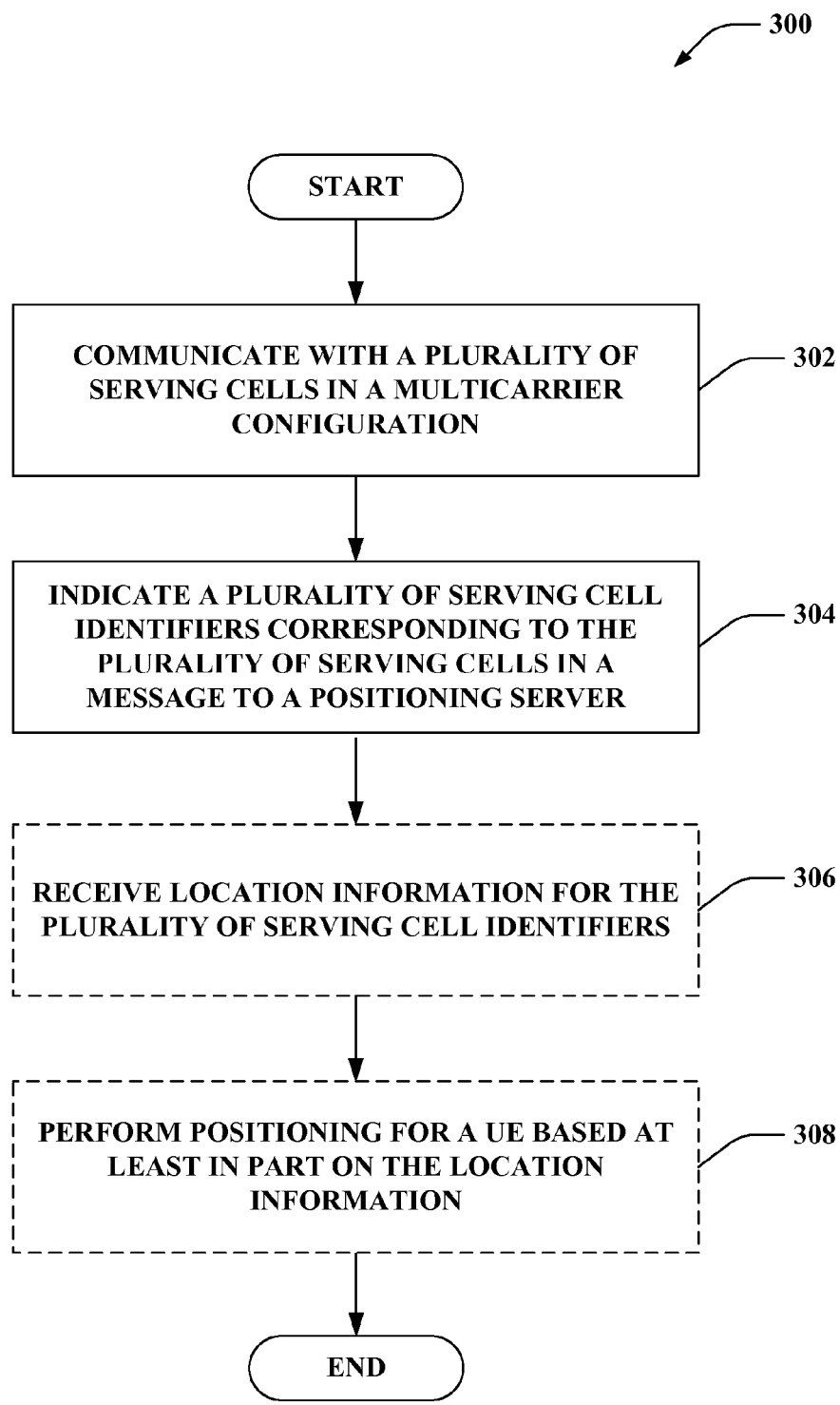
FIG. 3 illustrates an example methodology for indicating multiple serving cell identifiers to a positioning server.
Figure 4:
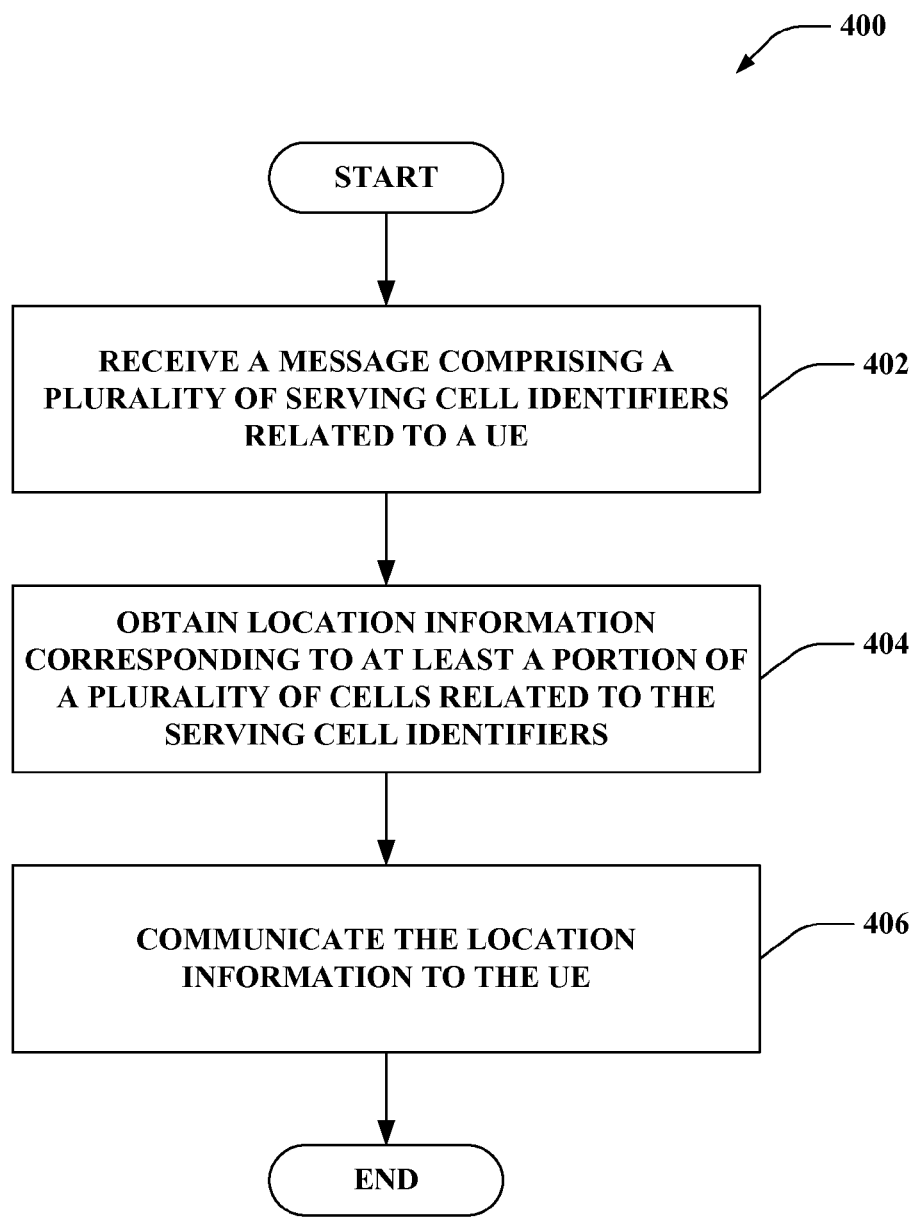
FIG. 4 illustrates an example methodology for communicating location information for multiple eNBs to a user equipment (UE).

FIGS. 3-4 illustrate example methodologies for indicating a plurality of serving cell identifiers in position determination. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 3 depicts an example methodology 300 that facilitates indicating a plurality of serving cell identifiers to facilitate determining a position.

At 302, a plurality of serving cells can be communicated with in a multicarrier configuration. For example, this can include establishing a plurality of carriers with the plurality of serving cells, which can be provided by one or more eNBs, to receive separate or simultaneous data therefrom. From an indication of the plurality of serving cells, assumptions can be made regarding a location, an operating frequency utilized, and/or the like.

At 304, a plurality of serving cell identifiers corresponding to the plurality of serving cells can be indicated in a message to a positioning server. As described, the indication of the serving cells can be used to identify other cells or eNBs potentially nearby, other cells or eNBs that utilize a same operating frequency as at least one of the multiple carriers with the serving cells, and/or the like. This information can be used by the positioning server to gather location information of the serving cells and/or additional nearby cells to facilitate determining a position. As described, this can include indicating the plurality of serving cell identifiers in a LPP or SUPL message to the positioning server.

Optionally, at 306, location information for the plurality of serving cell identifiers can be received. For instance, this can include receiving information from the positioning server, such as an absolute or relative location of the plurality of serving cells, one or more other nearby cells, and/or the like. In an example, this can include receiving a message with the location information in a LPP or SUPL message.

Optionally, at 308, positioning can be performed for a UE based at least in part on the location information. For example, OTDOA, A-GNSS, E-CID, or other positioning algorithms can be performed based on the location information and signal strength measurements of the cells indicated in the location information. In another example, the UE can determine whether one or more of the cells indicated in the location information communicates on a similar operating frequency as at least one of the plurality of serving cells before measuring signals thereof. This determination can be made based on a frequency specified in the location information and/or the like. In another example, the UE can attempt to measure signals of cells specified in the location information, and where no signal is observed (e.g., because the cell is provided on another frequency or otherwise), the location information for the cell is not used in determining the position of UE.

FIG. 4 illustrates an example methodology 400 for providing location information of multiple cells to a UE.

At 402, a message comprising a plurality of serving cell identifiers related to a UE can be received. For example, this can include obtaining the serving cell identifiers in a LPP or SUPL message extended or otherwise utilized to support providing such information, as described. The message can be received from a UE, MME, etc., as described.

At 404, location information corresponding to at least a portion of a plurality of cells related to the serving cell identifiers can be obtained. This can include obtaining location information for the cells or related eNBs corresponding to the received serving cell identifiers. In addition, location information for other cells nearby the serving cells and/or that utilize the same operating frequency can be obtained, as described above. In one example, nearby cells can be determined based on identifying all cells corresponding to the serving cell identifiers instead of one or a portion thereof. The location information can be previously received from the cells or from other entities on behalf of the cells, as described.

At 406, the location information can be communicated to the UE. This can include communicating the information in one or more SUPL or LPP messages (e.g., via an eNB serving the UE, which can be over a PCC). The location information can include a location of the plurality of cells or related eNBs, an operating frequency of the plurality of cells, identifiers of the plurality of cells, and/or the like. Thus, the UE can determine which cells to measure for positioning based on the location information, as described.

Figure 5:
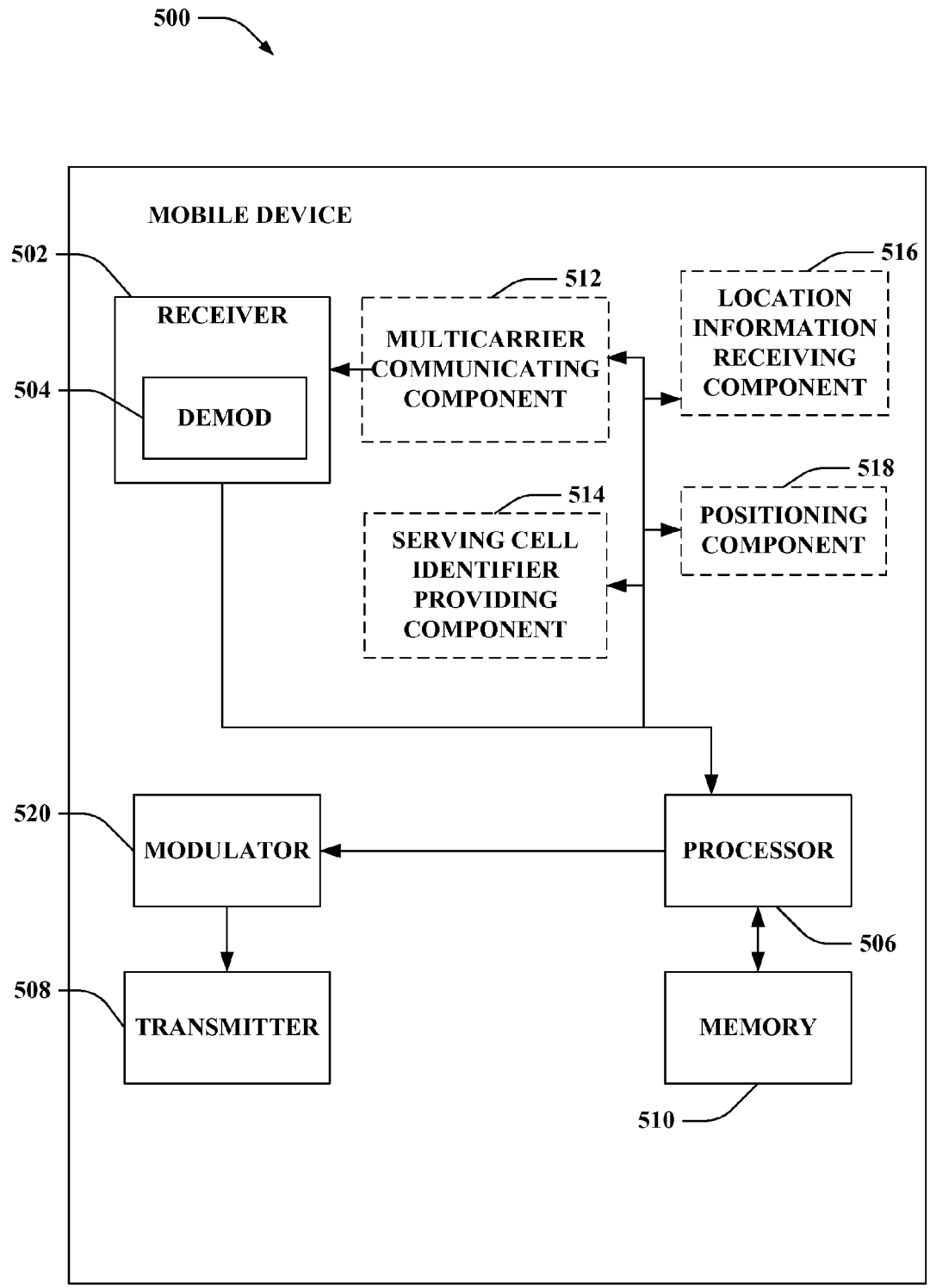
FIG. 5 illustrates an example mobile device in accordance with aspects described herein.

FIG. 5 is an illustration of a mobile device 500 that facilitates indicating multiple serving cell identifiers to a positioning server. Mobile device 500 may include a receiver 502 that receives a signal from, for instance, a receive antenna (not shown), performs typical actions on (e.g., filters, amplifies, downconverts, etc.) the received signal, and digitizes the conditioned signal to obtain samples. Receiver 502 can include a demodulator 504 that can demodulate received symbols and provide them to a processor 506 for channel estimation. Processor 506 can be a processor dedicated to analyzing information received by receiver 502 and/or generating information for transmission by a transmitter 508, a processor that controls one or more components of mobile device 500, and/or a processor that both analyzes information received by receiver 502, generates information for transmission by transmitter 508, and controls one or more components of mobile device 500.

Mobile device 500 can additionally include memory 510 that is operatively coupled to (e.g., capable of being in electronic communication with) processor 506 and that can store data to be transmitted, received data, information related to cells/related eNBs, data associated with signals, and any other suitable information. Memory 510 can additionally store protocols and/or algorithms associated with the various methodologies and examples for wireless device positioning.

It will be appreciated that the data store (e.g., memory 510) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES- DRAM), SyncLink DRAM (SLDRAM), and direct Rambus RAM (DRRAM). The memory 510 of the subject systems and methods is intended to include, without being limited to, these and any other suitable types of memory.

Receiver 502, in one example, can be operatively coupled (or can include) a multicarrier communicating component 512 for managing communications over a plurality of aggregated carriers with one or more eNBs (e.g., a PCC, one or more SCCs, etc.). Multicarrier communicating component 512 can be similar to multicarrier communicating component 212, for instance. In one example, multicarrier communicating component 512 can additionally or alternatively coupled to processor 506.

Processor 506 can further be optionally operatively coupled to a serving cell identifier providing component 514, which can be similar to serving cell providing component 214, a location information receiving component 516, which can be similar to location information receiving component 216, and/or a positioning component 518, which can be similar to positioning component 218. Mobile device 500 still further includes a modulator 520 that modulates signals for transmission by transmitter 508 to, for instance, a base station, another mobile device, etc. For example, transmitter 508 can transmit serving cell identifiers to a positioning server via one or more base stations, as described. Moreover, for example, mobile device 500 can include multiple transmitters 508 for multiple network interfaces, as described. Although depicted as being separate from the processor 506, it is to be appreciated that the multicarrier communicating component 512, serving cell identifier providing component 514, location information receiving component 516, positioning component 518, demodulator 504, and/or modulator 520 can be part of the processor 506 or multiple processors (not shown)), and/or stored as instructions in memory 510 for execution by processor 506.

Figure 6:
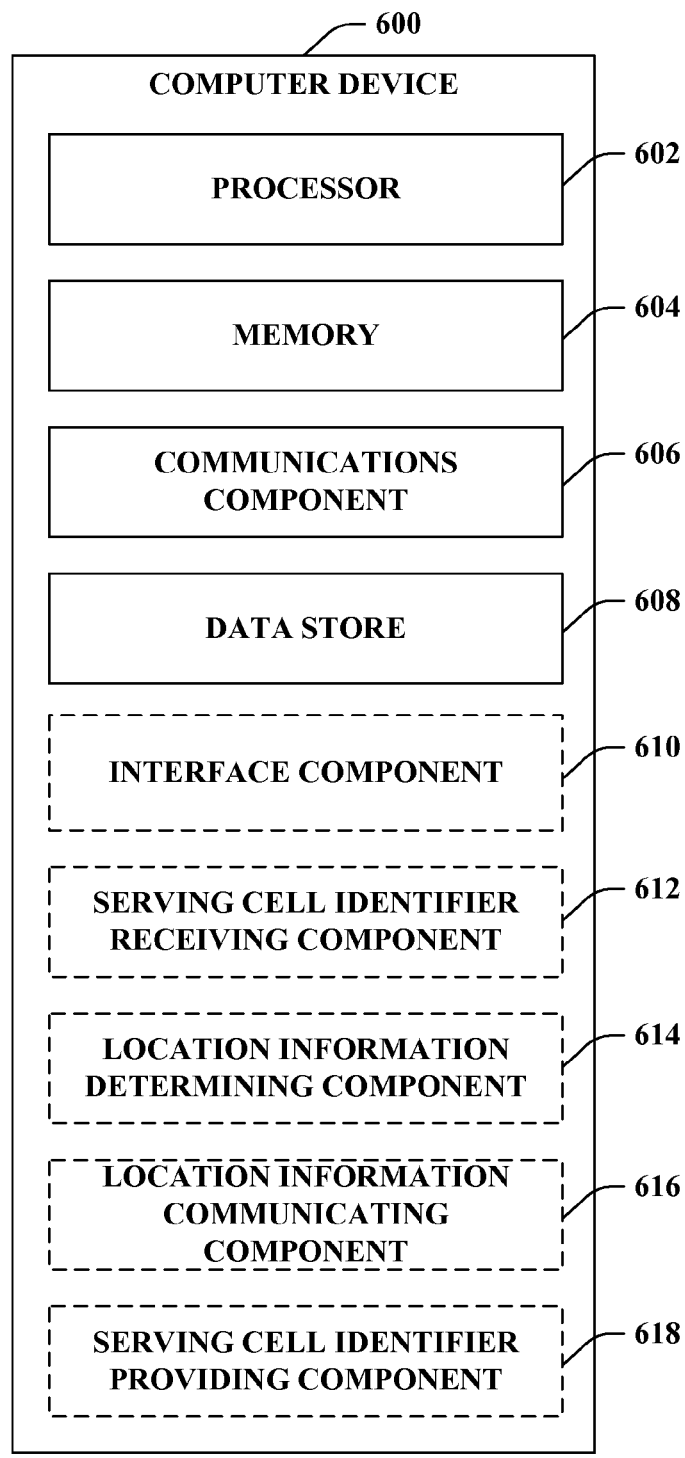
FIG. 6 illustrates an example computer device in accordance with aspects described herein.

FIG. 6 illustrates a computer device 600 that can include a positioning server 204, an MME 250, etc. Computer device 600 includes a processor 602 for carrying out processing functions associated with one or more of components and functions described herein. Processor 602 can include a single or multiple set of processors or multi-core processors. Moreover, processor 602 can be implemented as an integrated processing system and/or a distributed processing system.

Computer device 600 further includes a memory 604, such as for storing local versions of applications being executed by processor 602. Memory 604 can include substantially any type of memory usable by a computer, such as random access memory (RAM), read only memory (ROM), flash memory, tapes, magnetic discs, optical discs, volatile memory, nonvolatile memory, and combinations thereof. Computer device 600 can also include one or more components which can be stored in memory 604, executed by processor 602 (e.g., based on instructions stored in memory 604), be implemented within one or more processors 602, and/or the like.

Further, computer device 600 includes a communications component 606 that provides for establishing and maintaining communications with one or more parties utilizing hardware, software/firmware, and services as described herein. Communications component 606 may carry communications between components on computer device 600, as well as between computer device 600 and external devices, such as devices located across a communications network and/or devices serially or locally connected to computer device 600. For example, communications component 606 may include one or more buses, and may further include transmit chain components and receive chain components associated with a transmitter and receiver, respectively, operable for interfacing with external devices.

Additionally, computer device 600 may further include a data store 608, which can be any suitable combination of hardware and/or software/firmware, that provides for mass storage of information, databases, and programs employed in connection with aspects described herein. For example, data store 608 may be a data repository for applications not currently being executed by processor 602.

Computer device 600 may optionally include an interface component 610 operable to receive inputs from a user of computer device 600, and further operable to generate outputs. Interface component 610 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 610 may include one or more output devices, including but not limited to a display, a speaker, a haptic feedback mechanism, a printer, any other mechanism capable of presenting an output to a user, or any combination thereof. In another example, interface component 610 can be an application programming interface (API) that can be accessed by one or more devices to perform functions on computer device 600.

In addition, in the depicted example, computer device 600 can optionally include one or more of a serving cell identifier receiving component 612, which can be similar to serving cell identifier receiving component 220 or 252, a location information determining component 614, which can be similar to location information determining component 222, a location information communicating component 616, which can be similar location information communicating component 224, and/or a serving cell identifier providing component 618, which can be similar to serving cell identifier providing component 254. Thus, these components 612, 614, 616, and/or 618 can utilize processor 602 to execute instructions associated therewith, memory 604 to store information associated therewith, communications component 606 to carry out communications, and/or the like, as described. In addition, it is to be appreciated that computer device 600 can include additional or alternative components described herein.

Figure 7:
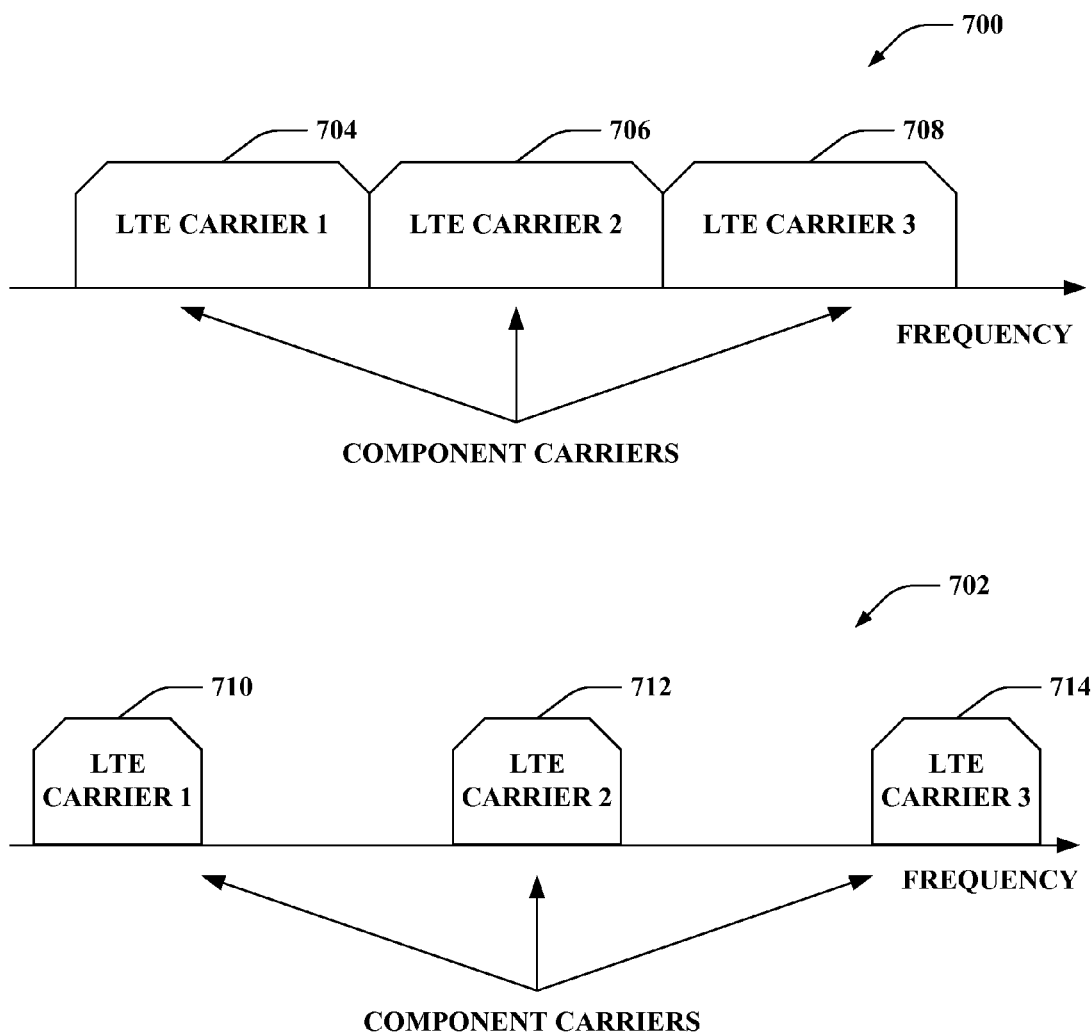
FIG. 7 illustrates example carrier aggregation configurations.

Various aspects herein are described in terms of multicarrier configurations. Some examples of a multicarrier configuration are proposed for the LTE-Advanced mobile systems including continuous carrier aggregation (CA) and non-continuous CA, examples of which are illustrated in FIG. 7. Continuous CA is shown at 700 and occurs when multiple available component carriers 704, 706, and 708 are assigned as adjacent to each other in frequency. In non-continuous CA, shown at 702, the component carriers 710, 712, and 714 can be assigned such that they are not adjacent in frequency. Both non-continuous and continuous CA aggregate multiple LTE/component carriers to serve a single unit of LTE-Advanced UE, for example.

An LTE-Advanced UE can employ multiple radio frequency (RF) receiving units and multiple fast Fourier transforms with non-continuous CA since the carriers are separated along the frequency band. Where continuous CA is used, one RF receiving component and FFT may be sufficient to receive over all carriers. Because non-continuous CA supports data transmissions over multiple separated carriers across a large frequency range, propagation path loss, Doppler shift and other radio channel characteristics may vary at different frequency bands.

Thus, to support broadband data transmission under the non-continuous CA approach, methods may be used to adaptively adjust coding, modulation, and transmission power for different component carriers. For example, in an LTE-Advanced system where the eNB has fixed transmitting power on each component carrier, the effective coverage or supportable modulation and coding of each component carrier may be different. In any case, the carriers 704, 706, and 708, or 710, 712, and 714 can be assigned by multiple eNBs or related cells, and the LTE-Advanced UE can report cell identifiers for each to a positioning server, as described.

Figure 8:
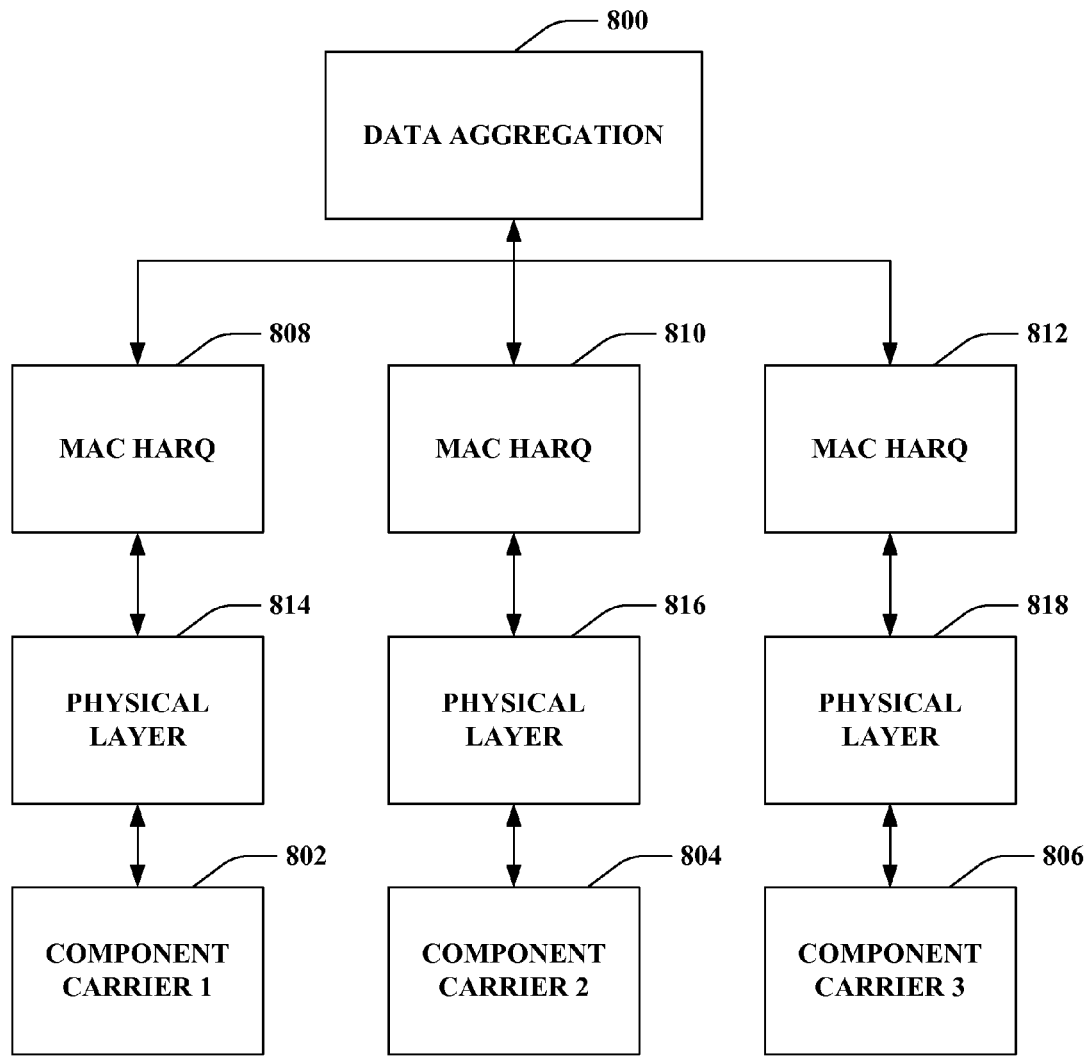
FIG. 8 illustrates example MAC layer carrier aggregation.

FIG. 8 illustrates example data aggregation 800 to aggregate transmission blocks (TBs) from different component carriers 802, 804, and 806 at the medium access control (MAC) layer for an International Mobile Telecommunications (IMT)-Advanced or similar system. With MAC layer data aggregation, each component carrier 802, 804, and 806, has its own independent hybrid automatic repeat request (HARD) entity 808, 810, and 812 in the MAC layer and its own transmission configuration parameters (e.g., transmitting power, modulation and coding schemes, and multiple antenna configuration) in the physical layer. Similarly, in the physical layer, one HARQ entity can be provided for each component carrier, e.g., via Physical Layer entities 814, 816, and 818.

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers can be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. This method, however, may not be compatible with some LTE systems.

Moreover, for example, in CA, control functions from at least two carriers can be aggregated onto one carrier to form a PCC and one or more associated SCCs. Communication links can be established for the PCC and each SCC with one or more cells or related eNBs. Then, communication can be controlled based on the PCC, in one example of a multicarrier configuration.

Figure 9:
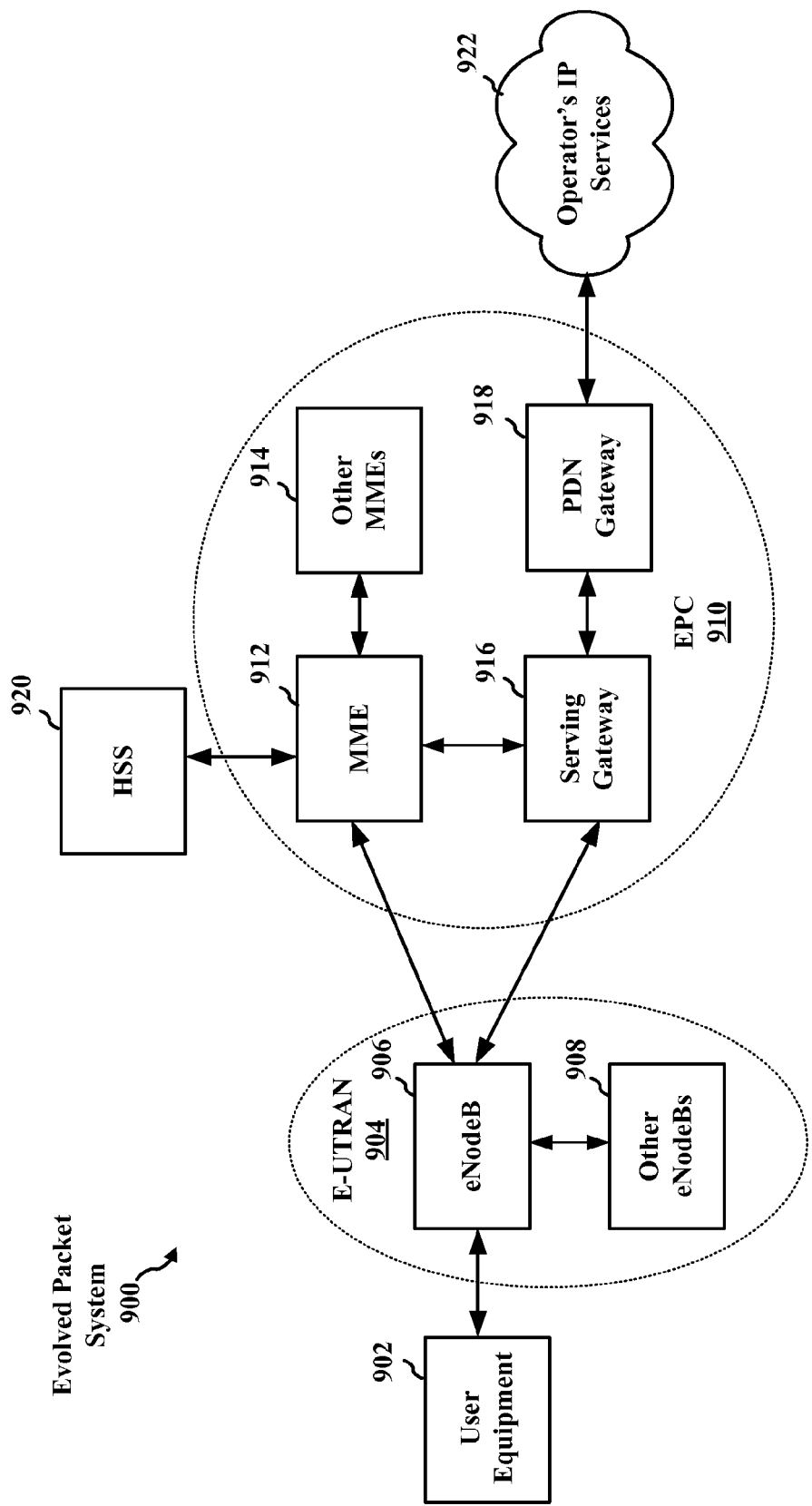
FIG. 9 is a diagram illustrating an example of a network architecture.

FIG. 9 is a diagram illustrating an LTE network architecture 900. The LTE network architecture 900 may be referred to as an Evolved Packet System (EPS) 900. The EPS 900 may include one or more user equipment (UE) 902, an Evolved UMTS Terrestrial Radio Access Network (E-UTRAN) 904, an Evolved Packet Core (EPC) 910, a Home Subscriber Server (HSS) 920, and an Operator's IP Services 922. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 906 and other eNBs 908. The eNB 906 provides user and control planes protocol terminations toward the UE 902. The eNB 906 may be connected to the other eNBs 908 via an X2 interface (e.g., backhaul). The eNB 906 may also be referred to as a base station, a base transceiver station, a radio base station, a radio transceiver, a transceiver function, a basic service set (BSS), an extended service set (ESS), or some other suitable terminology. The eNB 906 provides an access point to the EPC 910 for a UE 902. Examples of UEs 902 include a cellular phone, a smart phone, a session initiation protocol (SIP) phone, a laptop, a netbook, an ultrabook, a smartbook, a personal digital assistant (PDA), a satellite radio, a global positioning system, a multimedia device, a video device, a digital audio player (e.g., MP3 player), a camera, a game console, or any other similar functioning device. The UE 902 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 906 is connected by an S1 interface to the EPC 910. The EPC 910 includes a Mobility Management Entity (MME) 912, other MMEs 914, a Serving Gateway 916, and a Packet Data Network (PDN) Gateway 918. The MME 912 is the control node that processes the signaling between the UE 902 and the EPC 910. Generally, the MME 912 provides bearer and connection management. All user IP packets are transferred through the Serving Gateway 916, which itself is connected to the PDN Gateway 918. The PDN Gateway 918 provides UE IP address allocation as well as other functions. The PDN Gateway 918 is connected to the Operator's IP Services 922. The Operator's IP Services 922 may include the Internet, an intranet, an IP (Internet Protocol) Multimedia Subsystem (IMS), and a Packet-switched Streaming Service (PSS).

Figure 10:
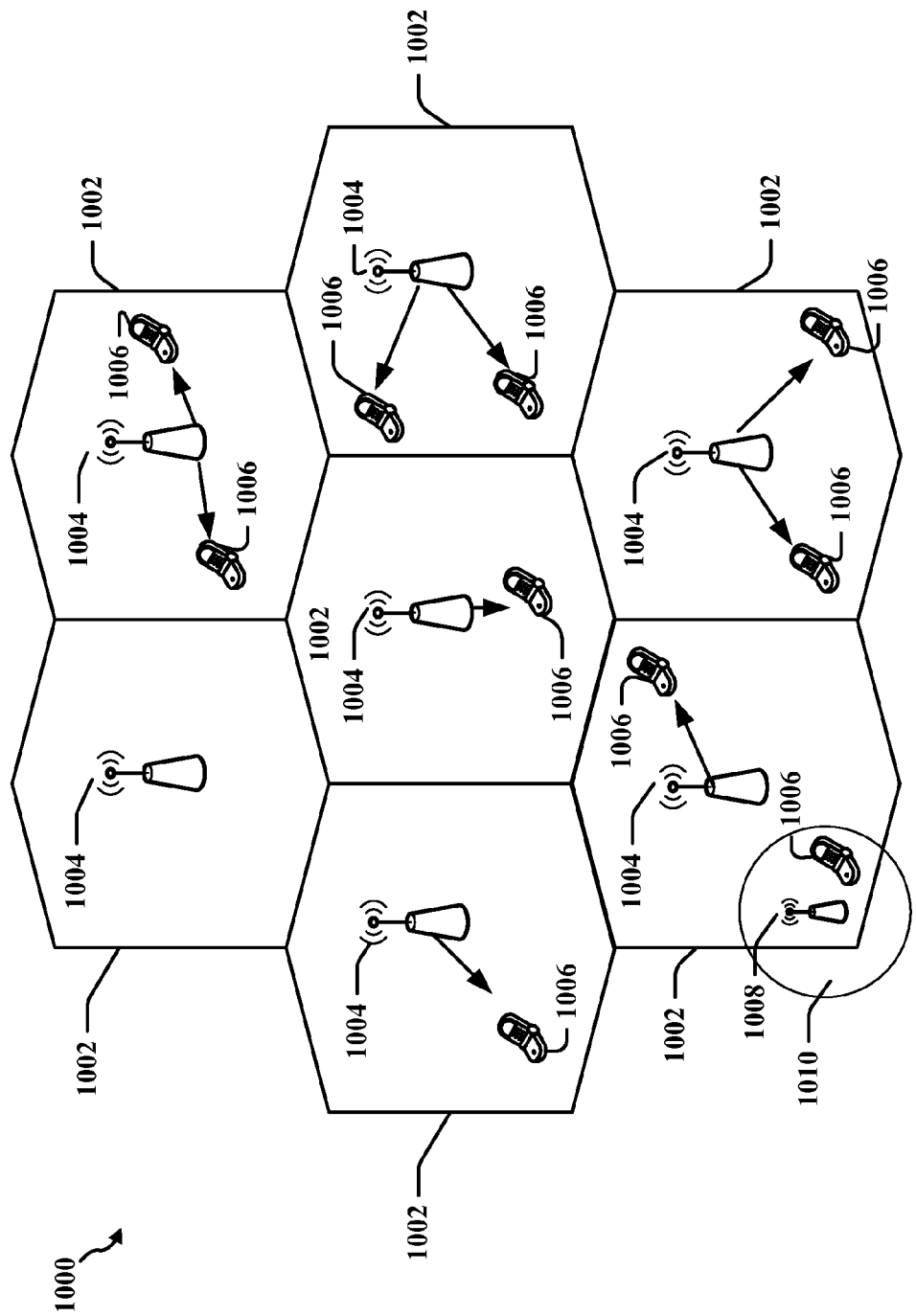
FIG. 10 is a diagram illustrating an example of an access network.

FIG. 10 is a diagram illustrating an example of an access network 1000 in an LTE network architecture. In this example, the access network 1000 is divided into a number of cellular regions (cells) 1002. One or more lower power class eNBs 1008 may have cellular regions 1010 that overlap with one or more of the cells 1002. A lower power class eNB 1008 may be referred to as a remote radio head (RRH). The lower power class eNB 1008 may be a femto cell (e.g., home eNB (HeNB), pico cell, or micro cell). The macro eNBs 1004 are each assigned to a respective cell 1002 and are configured to provide an access point to the EPC 910 for all the UEs 1006 in the cells 1002. There is no centralized controller in this example of an access network 1000, but a centralized controller may be used in alternative configurations. The eNBs 1004 are responsible for all radio related functions including radio bearer control, admission control, mobility control, scheduling, security, and connectivity to the serving gateway 916.

The modulation and multiple access scheme employed by the access network 1000 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 1004 may have multiple antennas supporting MIMO technology. The use of MIMO technology enables the eNBs 1004 to exploit the spatial domain to support spatial multiplexing, beamforming, and transmit diversity. Spatial multiplexing may be used to transmit different streams of data simultaneously on the same frequency. The data steams may be transmitted to a single UE 1006 to increase the data rate or to multiple UEs 1006 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 1006 with different spatial signatures, which enables each of the UE(s) 1006 to recover the one or more data streams destined for that UE 1006. On the UL, each UE 1006 transmits a spatially precoded data stream, which enables the eNB 1004 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

For clarity, various aspects of an access network are described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 11:
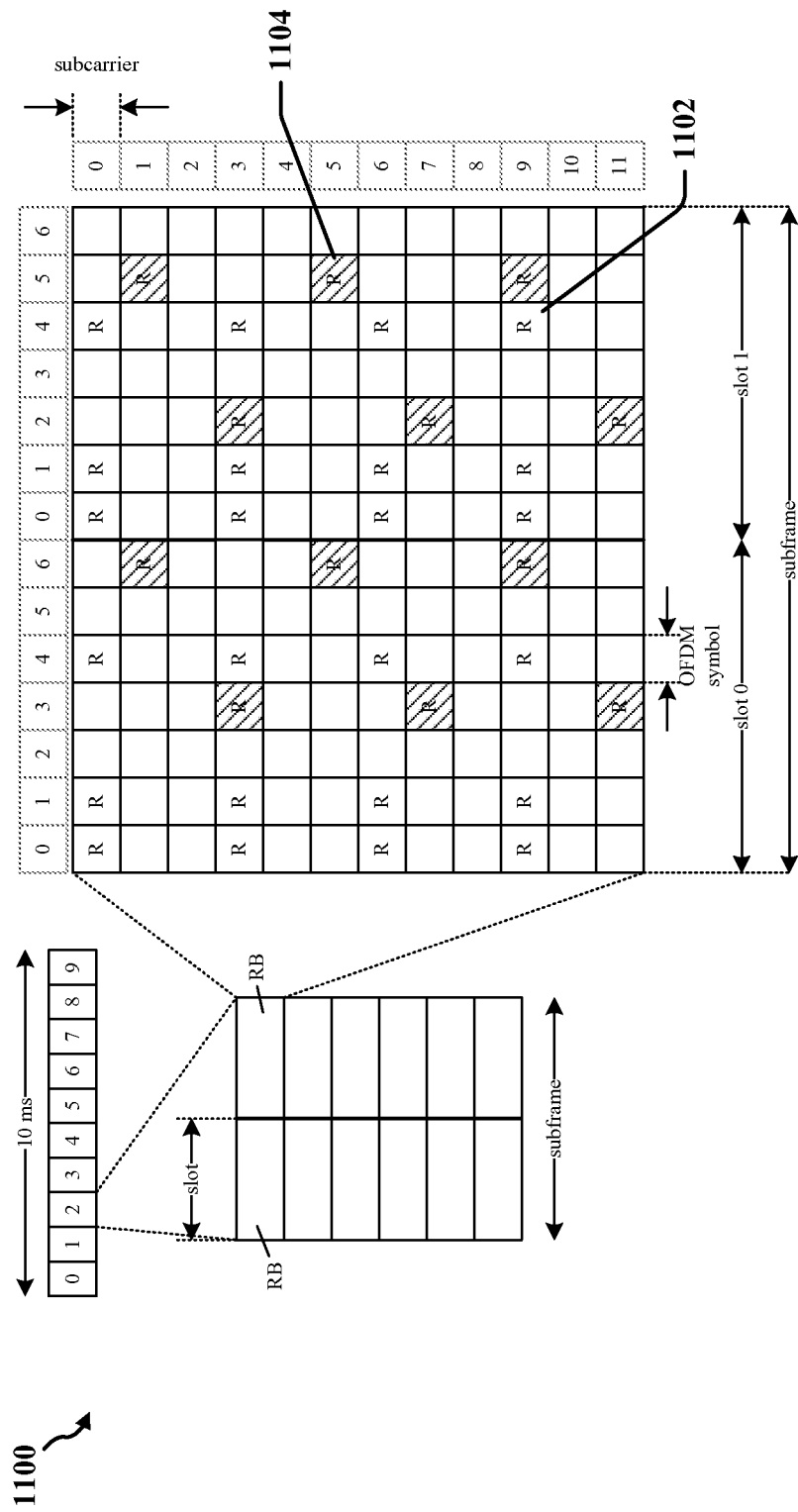
FIG. 11 is a diagram illustrating an example of a downlink (DL) frame structure in long term evolution (LTE).

FIG. 11 is a diagram 1100 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 1102, 1104, include DL reference signals (DL-RS). The DL-RS include Cell-specific RS (CRS) (also sometimes called common RS) 1102 and UE-specific RS (UE-RS) (also known as demodulation reference signals (DM-RS)) 1104. UE-RS 1104 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 12:
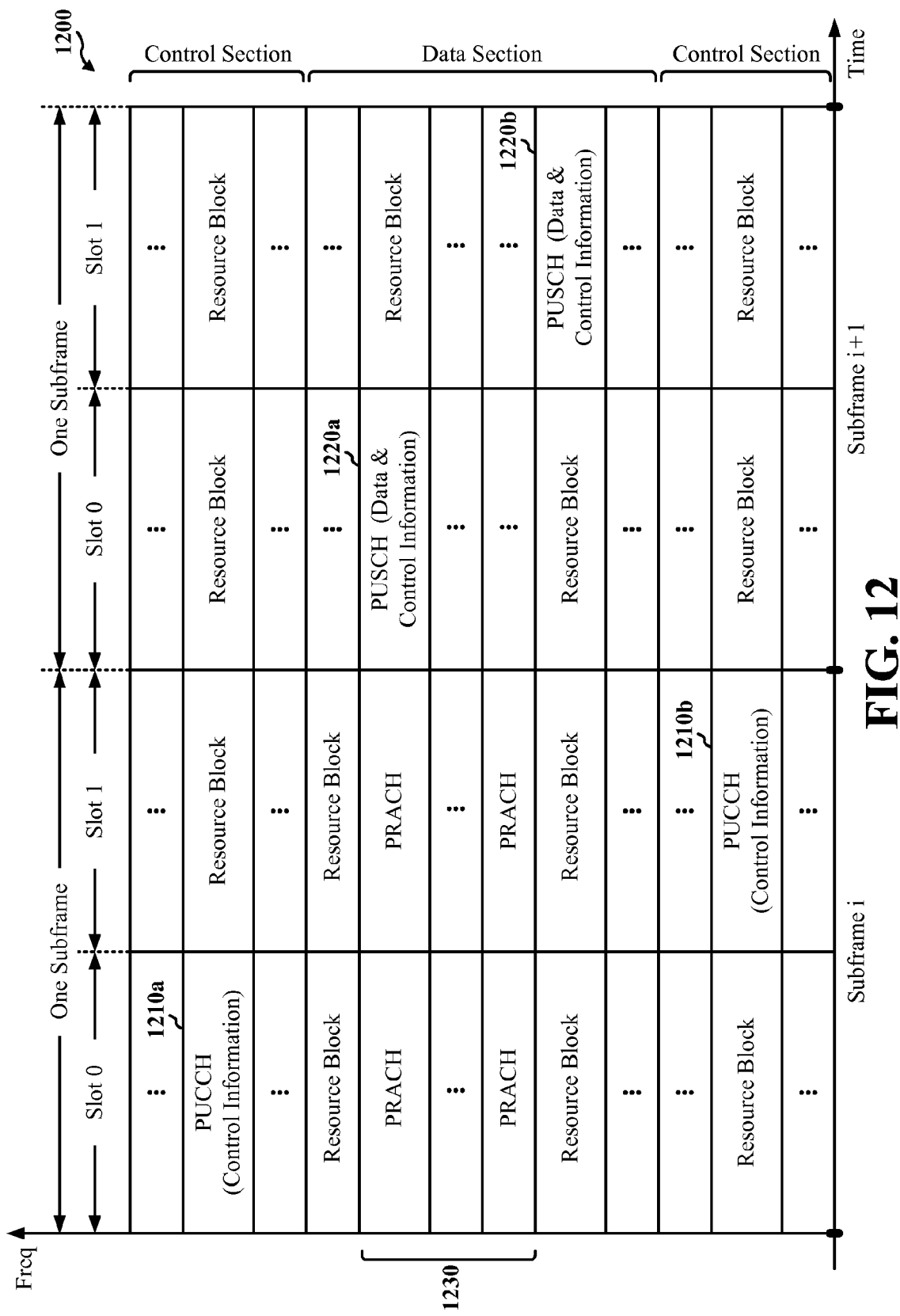
FIG. 12 is a diagram illustrating an example of an uplink (UL) frame structure in LTE.

FIG. 12 is a diagram 1200 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 1210a, 1210b in the control section to transmit control information to an eNB. The UE may also be assigned resource blocks 1220a, 1220b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 1230. The PRACH 1230 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 13:
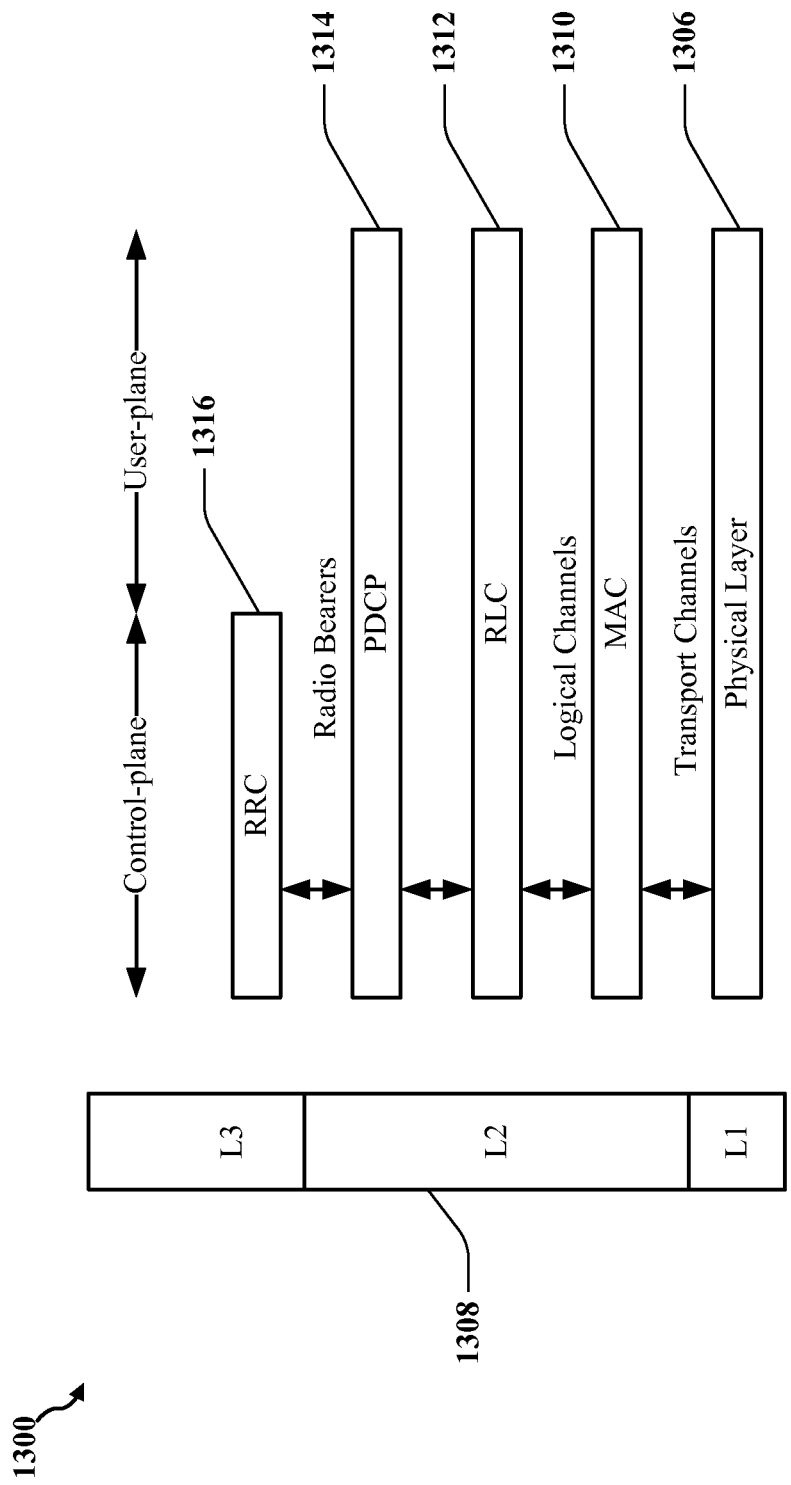
FIG. 13 is a diagram illustrating an example of a radio protocol architecture for the user and control planes.

FIG. 13 is a diagram 1300 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 1306. Layer 2 (L2 layer) 1308 is above the physical layer 1306 and is responsible for the link between the UE and eNB over the physical layer 1306.

In the user plane, the L2 layer 1308 includes a media access control (MAC) sublayer 1310, a radio link control (RLC) sublayer 1312, and a packet data convergence protocol (PDCP) 1314 sublayer, which are terminated at the eNB on the network side. Although not shown, the UE may have several upper layers above the L2 layer 1308 including a network layer (e.g., IP layer) that is terminated at an PDN gateway on the network side, and an application layer that is terminated at the other end of the connection (e.g., far end UE, server, etc.).

The PDCP sublayer 1314 provides multiplexing between different radio bearers and logical channels. The PDCP sublayer 1314 also provides header compression for upper layer data packets to reduce radio transmission overhead, security by ciphering the data packets, and handover support for UEs between eNBs. The RLC sublayer 1312 provides segmentation and reassembly of upper layer data packets, retransmission of lost data packets, and reordering of data packets to compensate for out-of-order reception due to hybrid automatic repeat request (HARQ). The MAC sublayer 1310 provides multiplexing between logical and transport channels. The MAC sublayer 1310 is also responsible for allocating the various radio resources (e.g., resource blocks) in one cell among the UEs. The MAC sublayer 1310 is also responsible for HARQ operations.

In the control plane, the radio protocol architecture for the UE and eNB is substantially the same for the physical layer 1306 and the L2 layer 1308 with the exception that there is no header compression function for the control plane. The control plane also includes a radio resource control (RRC) sublayer 1316 in Layer 3 (L3 layer). The RRC sublayer 1316 is responsible for obtaining radio resources (e.g., radio bearers) and for configuring the lower layers using RRC signaling between the eNB and the UE.

Figure 14:
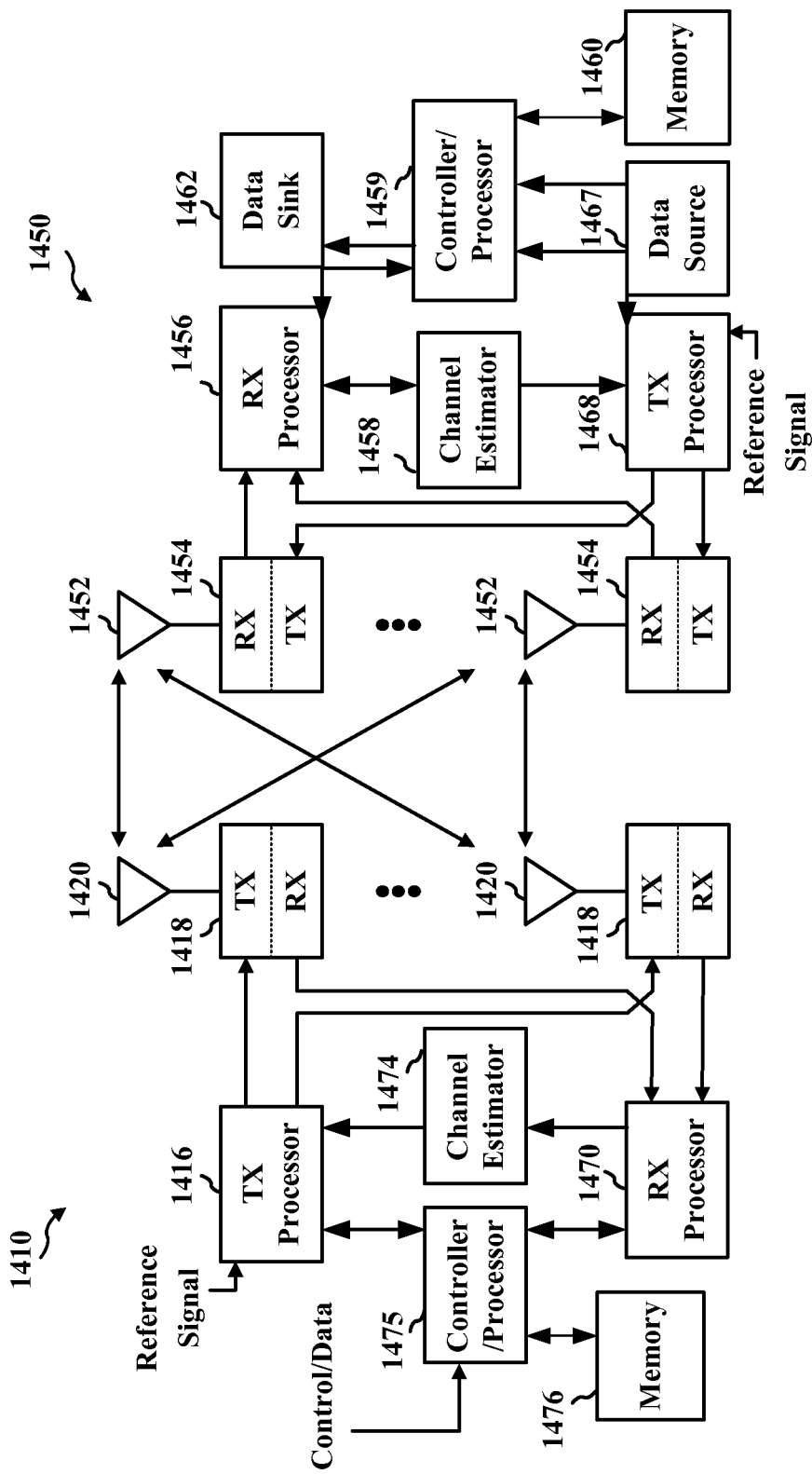
FIG. 14 is a diagram illustrating an example of an eNB and UE in an access network.

FIG. 14 is a block diagram of an eNB 1410 in communication with a UE 1450 in an access network. In the DL, upper layer packets from the core network are provided to a controller/processor 1475. The controller/processor 1475 implements the functionality of the L2 layer. In the DL, the controller/processor 1475 provides header compression, ciphering, packet segmentation and reordering, multiplexing between logical and transport channels, and radio resource allocations to the UE 1450 based on various priority metrics. The controller/processor 1475 is also responsible for HARQ operations, retransmission of lost packets, and signaling to the UE 1450.

The transmit (TX) processor 1416 implements various signal processing functions for the L1 layer (e.g., physical layer). The signal processing functions includes coding and interleaving to facilitate forward error correction (FEC) at the UE 1450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1474 may be used to determine the coding and modulation scheme, as well as for spatial processing. The channel estimate may be derived from a reference signal and/or channel condition feedback transmitted by the UE 1450. Each spatial stream is then provided to a different antenna 1420 via a separate transmitter 1418TX. Each transmitter 1418TX modulates an RF carrier with a respective spatial stream for transmission.

At the UE 1450, each receiver 1454RX receives a signal through its respective antenna 1452. Each receiver 1454RX recovers information modulated onto an RF carrier and provides the information to the receive (RX) processor 1456. The RX processor 1456 implements various signal processing functions of the L1 layer. The RX processor 1456 performs spatial processing on the information to recover any spatial streams destined for the UE 1450. If multiple spatial streams are destined for the UE 1450, they may be combined by the RX processor 1456 into a single OFDM symbol stream. The RX processor 1456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1410. These soft decisions may be based on channel estimates computed by the channel estimator 1458. The soft decisions are then decoded and deinterleaved to recover the data and control signals that were originally transmitted by the eNB 1410 on the physical channel. The data and control signals are then provided to the controller/processor 1459.

The controller/processor 1459 implements the L2 layer. The controller/processor 1459 can be associated with a memory 1460 that stores program codes and data. The memory 1460 may be referred to as a computer-readable medium. In the UL, the controller/processor 1459 provides demultiplexing between transport and logical channels, packet reassembly, deciphering, header decompression, control signal processing to recover upper layer packets from the core network. The upper layer packets are then provided to a data sink 1462, which represents all the protocol layers above the L2 layer. Various control signals may also be provided to the data sink 1462 for L3 processing. The controller/processor 1459 is also responsible for error detection using an acknowledgement (ACK) and/or negative acknowledgement (NACK) protocol to support HARQ operations.

In the UL, a data source 1467 is used to provide upper layer packets to the controller/processor 1459. The data source 1467 represents all protocol layers above the L2 layer. Similar to the functionality described in connection with the DL transmission by the eNB 1410, the controller/processor 1459 implements the L2 layer for the user plane and the control plane by providing header compression, ciphering, packet segmentation and reordering, and multiplexing between logical and transport channels based on radio resource allocations by the eNB 1410. The controller/processor 1459 is also responsible for HARQ operations, retransmission of lost packets, and signaling to the eNB 1410.

Channel estimates derived by a channel estimator 1458 from a reference signal or feedback transmitted by the eNB 1410 may be used by the TX processor 1468 to select the appropriate coding and modulation schemes, and to facilitate spatial processing. The spatial streams generated by the TX processor 1468 are provided to different antenna 1452 via separate transmitters 1454TX. Each transmitter 1454TX modulates an RF carrier with a respective spatial stream for transmission.

The UL transmission is processed at the eNB 1410 in a manner similar to that described in connection with the receiver function at the UE 1450. Each receiver 1418RX receives a signal through its respective antenna 1420. Each receiver 1418RX recovers information modulated onto an RF carrier and provides the information to a RX processor 1470. The RX processor 1470 may implement the L1 layer.

The controller/processor 1475 implements the L2 layer. The controller/processor 1475 can be associated with a memory 1476 that stores program codes and data. The memory 1476 may be referred to as a computer-readable medium. In the UL, the control/processor 1475 provides demultiplexing between transport and logical channels, packet reassembly, deciphering, header decompression, control signal processing to recover upper layer packets from the UE 1450. Upper layer packets from the controller/processor 1475 may be provided to the core network. The controller/processor 1475 is also responsible for error detection using an ACK and/or NACK protocol to support HARQ operations.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software/firmware, or combinations thereof. If implemented in software/firmware, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for performing positioning for a user equipment (UE), comprising:
   communicating with a plurality of serving cells in a multicarrier configuration, wherein the plurality of serving cells include a serving cell associated with a primary component carrier and one or more other serving cells associated with one or more secondary component carriers;
   indicating a plurality of serving cell identifiers corresponding to the plurality of serving cells in a message to a positioning server;
   receiving, from the positioning server, location information for each of the plurality of serving cell identifiers in response to the message, wherein the location information for one of the plurality of serving cell identifiers corresponding to a serving cell additionally corresponds to neighboring cells of the corresponding serving cell or other cells selected based at least in part on the corresponding serving cell; and
   performing positioning for a UE based at least in part on the received location information.

2. The method of claim 1, wherein the other cells are within a threshold distance of at least one of the plurality of serving cells, use a similar operating frequency as at least one of the plurality of serving cells, or are within radio visibility of at least one of the plurality of serving cells.

3. The method of claim 1, wherein the plurality of serving cell identifiers correspond to a global cell identifier, an operating frequency of the plurality of serving cells, or a carrier identifier.

4. The method of claim 1, wherein the message is a long term evolution positioning protocol (LPP) message.

5. The method of claim 1, wherein the message is a secure user plane location (SUPL) message.

6. The method of claim 5, wherein the indicating comprises including the plurality of serving cell identifiers as a Location ID in the SUPL message.

7. The method of claim 5, wherein the indicating comprises including the plurality of serving cell identifiers in a list of Multiple Location IDs in the SUPL message.

8. The method of claim 7, wherein the indicating comprises setting a serving cell flag to TRUE for each of the plurality of serving cell identifiers in the list of Multiple Location IDs.

9. The method of claim 7, wherein the indicating comprises specifying that each of the plurality of serving cell identifiers in the list of Multiple Location IDs have the same timestamp.

10. An apparatus for performing positioning for a user equipment (UE), comprising:
    means for communicating with a plurality of serving cells in a multicarrier configuration, wherein the plurality of serving cells include a serving cell associated with a primary component carrier and one or more other serving cells associated with one or more secondary component carriers;
    means indicating a plurality of serving cell identifiers corresponding to the plurality of serving cells in a message to a positioning server;

means for receiving, from the positioning server, location information for each of the plurality of serving cell identifiers in response to the message, wherein the location information for one of the plurality of serving cell identifiers corresponding to a serving cell additionally corresponds to neighboring cells of the corresponding serving cell or other cells selected based at least in part on the corresponding serving cell; and means for performing positioning for a UE based at least in part on the received location information.

11. The apparatus of claim 10, wherein the other cells are within a threshold distance of at least one of the plurality of serving cells, use a similar operating frequency as at least one of the plurality of serving cells, or are within radio visibility of at least one of the plurality of serving cells.

12. The apparatus of claim 10, wherein the plurality of serving cell identifiers correspond to a global cell identifier, an operating frequency of the plurality of serving cells, or a carrier identifier.

13. The apparatus of claim 10, wherein the message is a long term evolution positioning protocol (LPP) message.

14. The apparatus of claim 10, wherein the message is a secure user plane location (SUPL) message.

15. The apparatus of claim 14, wherein the means for indicating includes the plurality of serving cell identifiers as a Location ID in the SUPL message.

16. The apparatus of claim 14, wherein the means for indicating includes the plurality of serving cell identifiers in a list of Multiple Location IDs in the SUPL message.

17. The apparatus of claim 16, wherein the means for indicating sets a serving cell flag to TRUE for each of the plurality of serving cell identifiers in the list of Multiple Location IDs.

18. The apparatus of claim 16, wherein the means for indicating specifies that each of the plurality of serving cell identifiers in the list of Multiple Location IDs have the same timestamp.

19. A non-transitory computer-readable medium storing computer executable code comprising:
    code for communicating with a plurality of serving cells in a multicarrier configuration, wherein the plurality of serving cells include a serving cell associated with a primary component carrier and one or more other serving cells associated with one or more secondary component carriers;
    code for indicating a plurality of serving cell identifiers corresponding to the plurality of serving cells in a message to a positioning server;
    code for receiving, from the positioning server, location information for each of the plurality of serving cell identifiers in response to the message, wherein the location information for one of the plurality of serving cell identifiers corresponding to a serving cell additionally corresponds to neighboring cells of the corresponding serving cell or other cells selected based at least in part on the corresponding serving cell; and
    code for performing positioning for a UE based at least in part on the received location information.

20. The non-transitory computer-readable medium of claim 19, wherein the other cells are within a threshold distance of at least one of the plurality of serving cells, use a similar operating frequency as at least one of the plurality of serving cells, or are within radio visibility of at least one of the plurality of serving cells.

21. The non-transitory computer-readable medium of claim 19, wherein the plurality of serving cell identifiers correspond to a global cell identifier, an operating frequency of the plurality of serving cells, or a carrier identifier.

22. The non-transitory computer-readable medium of claim 19, wherein the message is a long term evolution positioning protocol (LPP) message.

23. The non-transitory computer-readable medium of claim 19, wherein the message is a secure user plane location (SUPL) message.

24. The non-transitory computer-readable medium of claim 23, wherein the code for indicating includes the plurality of serving cell identifiers as a Location ID in the SUPL message.

25. The non-transitory computer-readable medium of claim 23, wherein the code for indicating includes the plurality of serving cell identifiers in a list of Multiple Location IDs in the SUPL message.

26. The non-transitory computer-readable medium of claim 25, wherein the cod for indicating sets a serving cell flag to TRUE for each of the plurality of serving cell identifiers in the list of Multiple Location IDs.

27. The non-transitory computer-readable medium of claim 25, wherein the code for indicating specifies that each of the plurality of serving cell identifiers in the list of Multiple Location IDs have the same timestamp.

28. An apparatus for performing positioning for a user equipment (UE), comprising:
    a processor;
    a memory coupled to the processor;
    instructions stored in the memory, the instructions being executable by the processor to:
        communicate with a plurality of serving cells in a multicarrier configuration, wherein the plurality of serving cells include a serving cell associated with a primary component carrier and one or more other serving cells associated with one or more secondary component carriers;
        indicate a plurality of serving cell identifiers corresponding to the plurality of serving cells in a message to a positioning server;
        receive, from the positioning server, location information for each of the plurality of serving cell identifiers in response to the message, wherein the location information for one of the plurality of serving cell identifiers corresponding to a serving cell additionally corresponds to neighboring cells of the corresponding serving cell or other cells selected based at least in part on the corresponding serving cell; and
        perform positioning for a UE based at least in part on the received location information.

29. The apparatus of claim 28, wherein the other cells are within a threshold distance of at least one of the plurality of serving cells, use a similar operating frequency as at least one of the plurality of serving cells, or are within radio visibility of at least one of the plurality of serving cells.

30. The apparatus of claim 28, wherein the plurality of serving cell identifiers correspond to a global cell identifier, an operating frequency of the plurality of serving cells, or a carrier identifier.

31. The apparatus of claim 28, wherein the message is a long term evolution positioning protocol (LPP) message.

32. The apparatus of claim 28, wherein the message is a secure user plane location (SUPL) message.

33. The apparatus of claim 32, wherein the instructions being executable by the processor to indicate the plurality of serving cell identifiers specify the plurality of serving cell identifiers as a Location ID in the SUPL message.

34. The apparatus of claim 32, wherein the instructions being executable by the processor to indicate the plurality of serving cell identifiers specify the plurality of serving cell identifiers in a list of Multiple Location IDs in the SUPL message.

35. The apparatus of claim 34, wherein the instructions being executable by the processor to indicate the plurality of serving cell identifiers set a serving cell flag to TRUE for each of the plurality of serving cell identifiers in the list of Multiple Location IDs.

36. The apparatus of claim 34, wherein the instructions being executable by the processor to indicate the plurality of serving cell identifiers specify that each of the plurality of serving cell identifiers in the list of Multiple Location IDs have the same timestamp.

37. An apparatus for performing positioning for a user equipment (UE), comprising:
   a multicarrier communicating component configured to communicate with a plurality of serving cells in a multicarrier configuration, wherein the plurality of serving cells include a serving cell associated with a primary component carrier and one or more other serving cells associated with one or more secondary component carriers;
   a serving cell identifier providing component configured to indicate a plurality of serving cell identifiers corresponding to the plurality of serving cells in a message to a positioning server;
   a location information receiving component configured to receive, from the positioning server, location information for each of the plurality of serving cell identifiers in response to the message, wherein the location information for one of the plurality of serving cell identifiers corresponding to a serving cell additionally corresponds to neighboring cells of the corresponding serving cell or other cells selected based at least in part on the corresponding serving cell; and
   a positioning component configured to perform positioning for a UE based at least in part on the received location information.

38. The apparatus of claim 37, wherein the other cells are within a threshold distance of at least one of the plurality of serving cells, use a similar operating frequency as at least one of the plurality of serving cells, or are within radio visibility of at least one of the plurality of serving cells.

39. The apparatus of claim 37, wherein the plurality of serving cell identifiers correspond to a global cell identifier, an operating frequency of the plurality of serving cells, or a carrier identifier.

40. The apparatus of claim 37, wherein the message is a long term evolution positioning protocol (LPP) message.

41. The apparatus of claim 37, wherein the message is a secure user plane location (SUPL) message.

42. The apparatus of claim 41, wherein the serving cell identifier providing component is further configured to include the plurality of serving cell identifiers as a Location ID in the SUPL message.

43. The apparatus of claim 41, wherein the serving cell identifier providing component is further configured to include the plurality of serving cell identifiers in a list of Multiple Location IDs in the SUPL message.

44. The apparatus of claim 43, wherein the serving cell identifier providing component is further configured to set a serving cell flag to TRUE for each of the plurality of serving cell identifiers in the list of Multiple Location IDs.

45. The apparatus of claim 43, wherein the serving cell identifier providing component is further configured to specify that each of the plurality of serving cell identifiers in the list of Multiple Location IDs have the same timestamp.

46. A method for providing location information to a user equipment (UE), comprising:
   receiving a message comprising a plurality of serving cell identifiers corresponding to a plurality of serving cells related to a UE, wherein the plurality of serving cells include a serving cell associated with a primary component carrier with the UE and one or more other serving cells associated with one or more secondary component carriers with the UE;
   obtaining location information corresponding to at least a portion of the plurality of serving cells related to each of the plurality of serving cell identifiers, wherein obtaining location information comprises including location information of one or more nearby cells related to each of the plurality of serving cells; and
   communicating the location information to the UE.

47. The method of claim 46, wherein:
   obtaining the location information comprises obtaining intra-frequency location information corresponding to one or more other cells utilizing a similar operating frequency as the plurality of serving cells; and
   communicating the location information comprises communicating the intra-frequency location information to the UE along with one or more identifiers corresponding to the one or more other cells.

48. The method of claim 46, wherein the message is a long term evolution positioning protocol (LPP) message or a secure user plane location (SUPL) message.

49. An apparatus for providing location information to a user equipment (UE), comprising:
   means for receiving a message comprising a plurality of serving cell identifiers corresponding to a plurality of serving cells related to a UE, wherein the plurality of serving cells include a serving cell associated with a primary component carrier with the UE and one or more other serving cells associated with one or more secondary component carriers with the UE;
   means for obtaining location information corresponding to at least a portion of the plurality of serving cells related to each of the plurality of serving cell identifiers, the location information including location information of one or more nearby cells related to each of the plurality of serving cells; and
   means for communicating the location information to the UE.

50. The apparatus of claim 49, wherein the means for obtaining further obtains intra-frequency location information corresponding to one or more other cells utilizing a similar operating frequency as the plurality of serving cells, and the means for communicating further communicates the intra-frequency location information to the UE along with one or more identifiers corresponding to the one or more other cells.

51. The apparatus of claim 49, wherein the message is a long term evolution positioning protocol (LPP) message or a secure user plane location (SUPL) message.

52. A non-transitory computer-readable medium storing computer executable code comprising:
   code for receiving a message comprising a plurality of serving cell identifiers corresponding to a plurality of serving cells related to a UE, wherein the plurality of serving cells include a serving cell associated with a primary component carrier with the UE and one or more other serving cells associated with one or more secondary component carriers with the UE;

code for obtaining location information corresponding to at least a portion of the plurality of serving cells related to each of the plurality of serving cell identifiers, the location information including location information of one or more nearby cells related to each of the plurality of serving cells; and code for communicating the location information to the UE.

53. The non-transitory computer-readable medium of claim 52, wherein the code for obtaining further obtains intra-frequency location information corresponding to one or more other cells utilizing a similar operating frequency as the plurality of serving cells, and the code for communicating further communicates the intra-frequency location information to the UE along with one or more identifiers corresponding to the one or more other cells.

54. The non-transitory computer-readable medium of claim 52, wherein the message is a long term evolution positioning protocol (LPP) message or a secure user plane location (SUPL) message.

55. An apparatus for providing location information to a user equipment (UE), comprising:
a processor;
a memory coupled to the processor;
instructions stored in the memory, the instructions being executable by the processor to:
receive a message comprising a plurality of serving cell identifiers corresponding to a plurality of serving cells related to a UE, wherein the plurality of serving cells include a serving cell associated with a primary component carrier with the UE and one or more other serving cells associated with one or more secondary component carriers with the UE;
obtain location information corresponding to at least a portion of the plurality of serving cells related to each of the plurality of serving cell identifiers, the location information including location information of one or more nearby cells related to each of the plurality of serving cells; and
communicate the location information to the UE.

56. The apparatus of claim 55, wherein the instructions being further executable by the processor to:
obtain the location information including intra-frequency location information corresponding to one or more other cells utilizing a similar operating frequency as the plurality of serving cells; and
communicate the location information including the intra-frequency location information to the UE along with one or more identifiers corresponding to the one or more other cells.

57. The apparatus of claim 55, wherein the message is a long term evolution positioning protocol (LPP) message or a secure user plane location (SUPL) message.

58. An apparatus for providing location information to a user equipment (UE), comprising:
a serving cell identifier receiving component configured to receive a message comprising a plurality of serving cell identifiers corresponding to a plurality of serving cells related to a UE, wherein the plurality of serving cells include a serving cell associated with a primary component carrier with the UE and one or more other serving cells associated with one or more secondary component carriers with the UE;
a location information determining component configured to obtain location information corresponding to at least a portion of the plurality of serving cells related to each of the plurality of serving cell identifiers, the location information including location information of one or more nearby cells related to each of the plurality of serving cells; and
a location information communicating component configured to communicate the location information to the UE.

59. The apparatus of claim 58, wherein the location information determining component is configured to obtain the location information including intra-frequency location information corresponding to one or more other cells utilizing a similar operating frequency as the plurality of serving cells, and wherein the location information communicating component is configured to communicate the location information including the intra-frequency location information to the UE along with one or more identifiers corresponding to the one or more other cells.

60. The apparatus of claim 58, wherein the message is a long term evolution positioning protocol (LPP) message or a secure user plane location (SUPL) message.

* * * * *